March 15, 1966 R. A. PETERSON 3,241,102
SYSTEM FOR SYNTHESIZING SEISMOGRAMS FROM WELL LOGS
Original Filed July 5, 1955 14 Sheets-Sheet 1

RAYMOND A. PETERSON,
INVENTOR.
BY Reed C. Lawlor
ATTORNEY.

RAYMOND A. PETERSON,
INVENTOR.

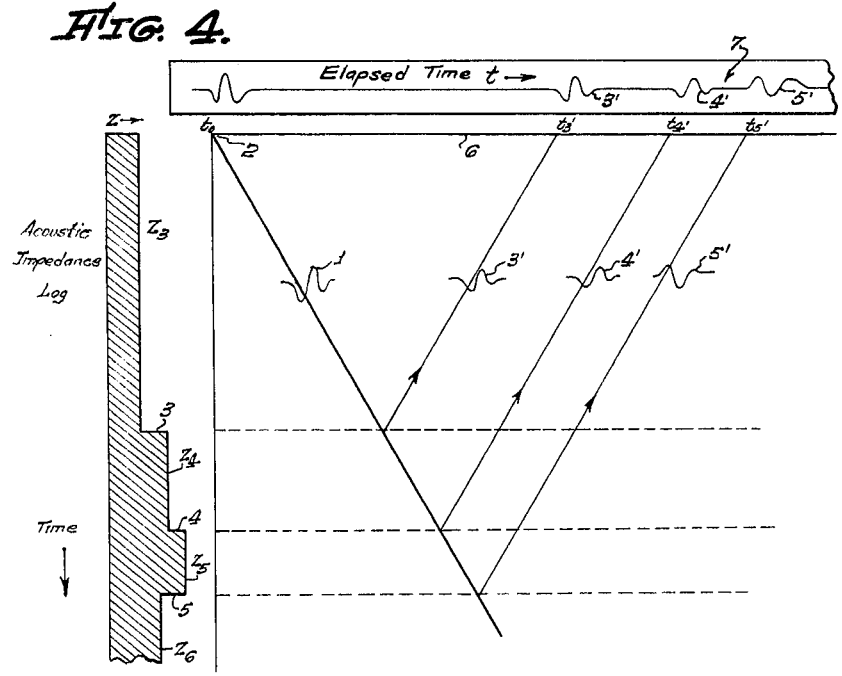
FIG. 4.
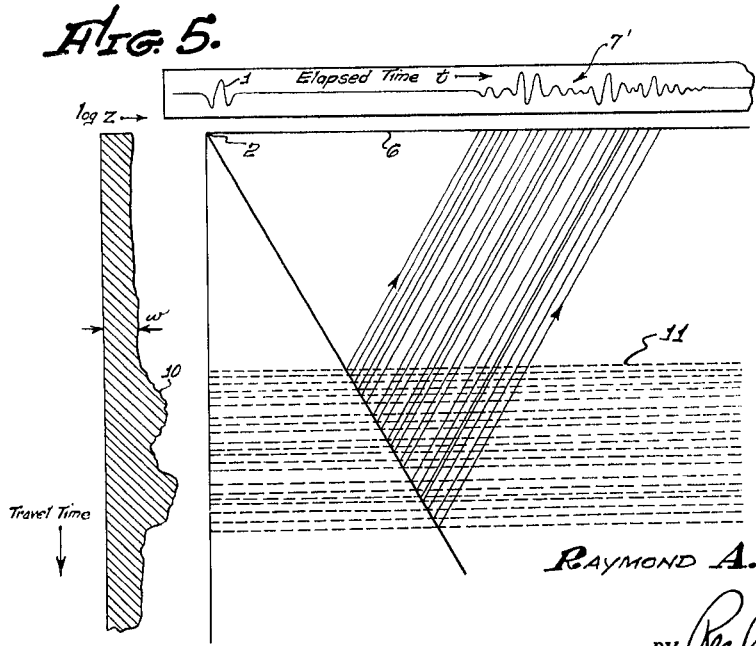
FIG. 5.
Raymond A. Peterson,
INVENTOR.
ATTORNEY.

RAYMOND A. PETERSON,
INVENTOR.

March 15, 1966 R. A. PETERSON 3,241,102
SYSTEM FOR SYNTHESIZING SEISMOGRAMS FROM WELL LOGS
Original Filed July 5, 1955 14 Sheets-Sheet 5
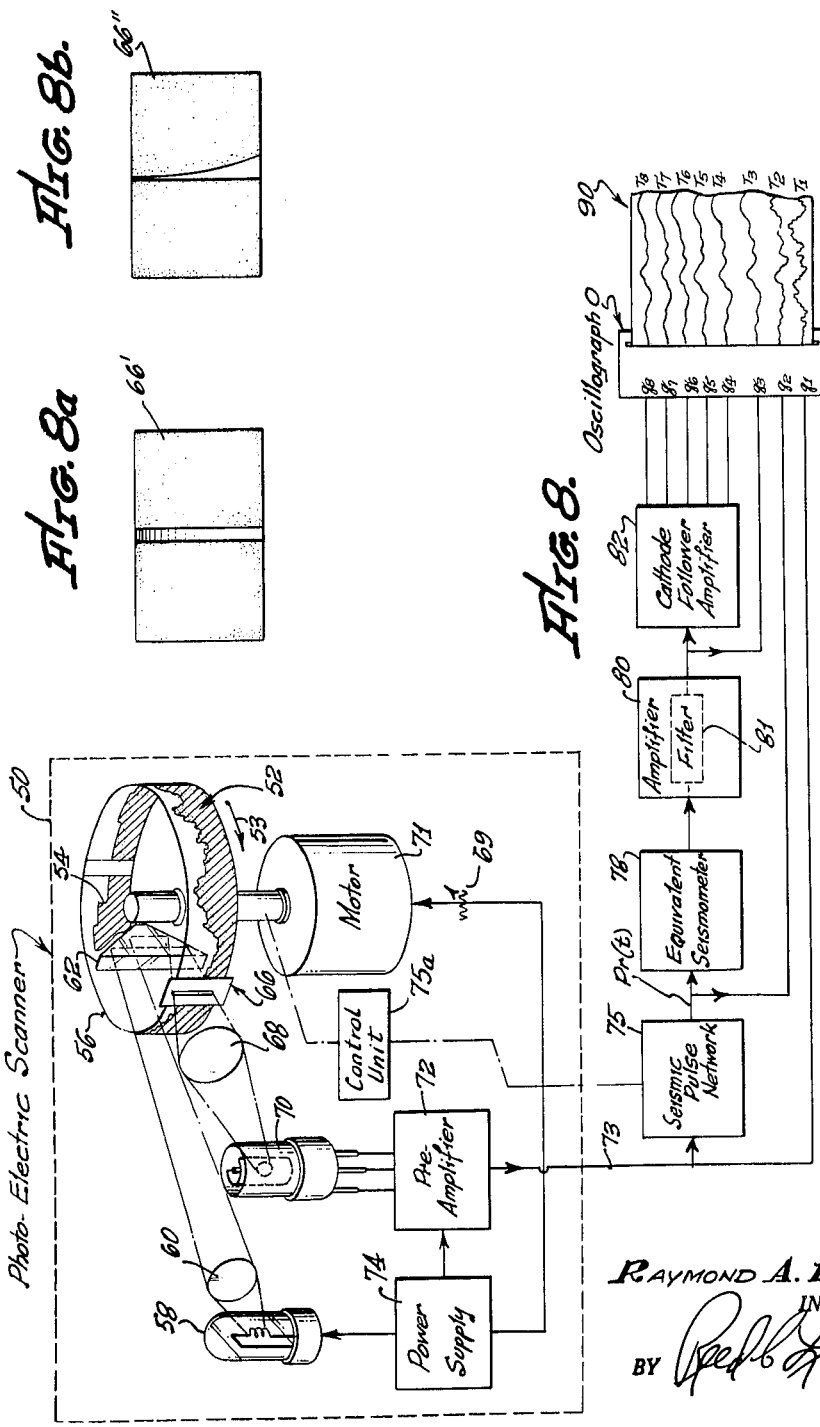
RAYMOND A. PETERSON,
INVENTOR.
BY
ATTORNEY.

March 15, 1966   R. A. PETERSON   3,241,102
SYSTEM FOR SYNTHESIZING SEISMOGRAMS FROM WELL LOGS
Original Filed July 5, 1955   14 Sheets-Sheet 6

RAYMOND A. PETERSON,
INVENTOR.

BY Reed C. Lawlor
ATTORNEY.

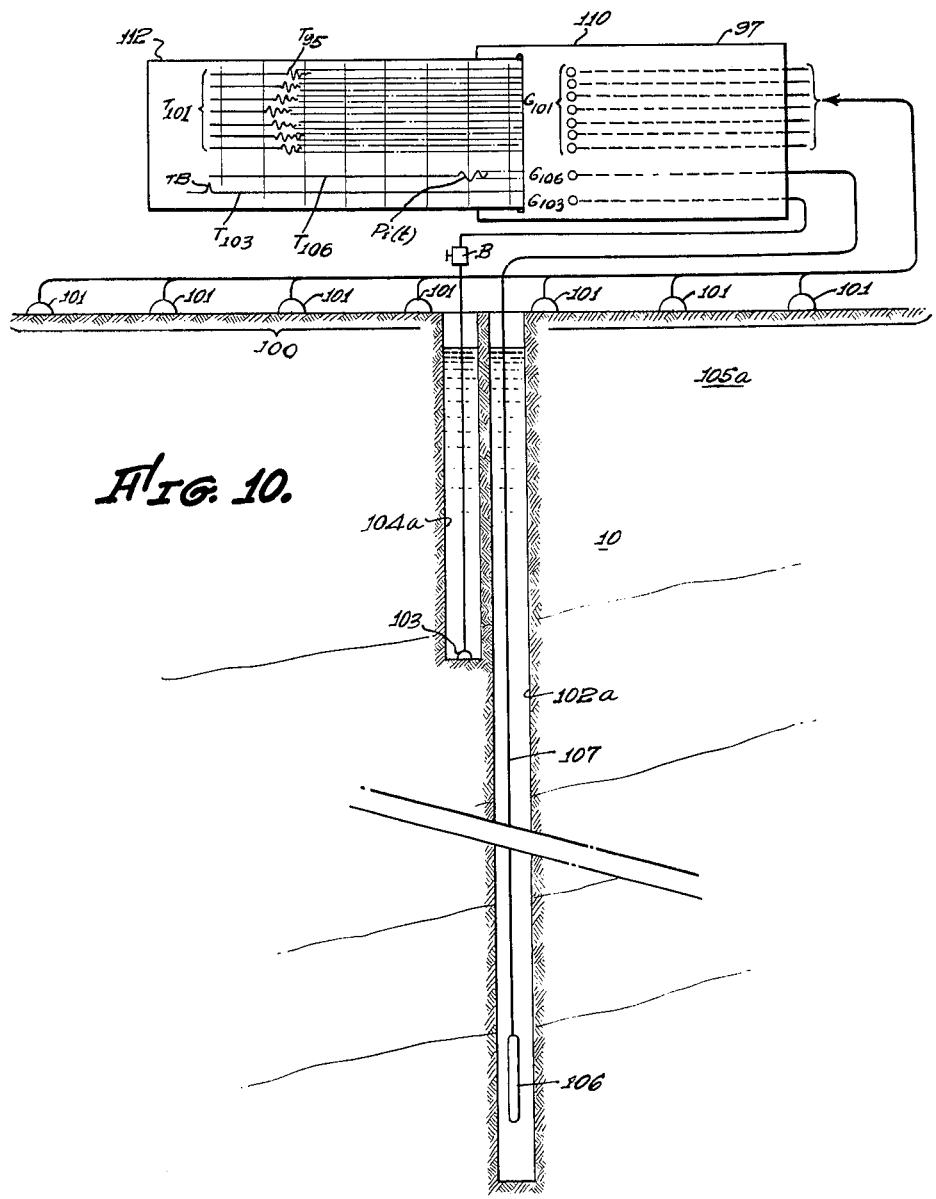

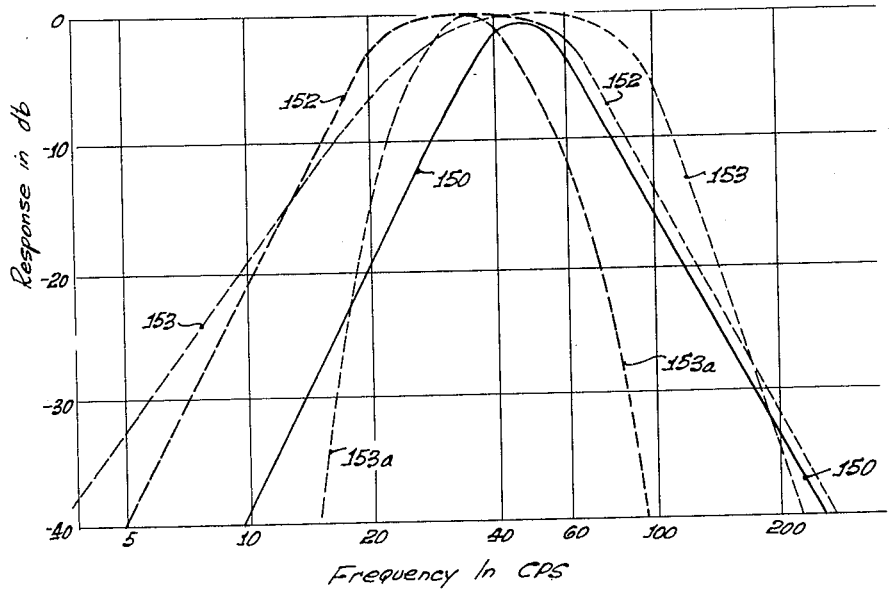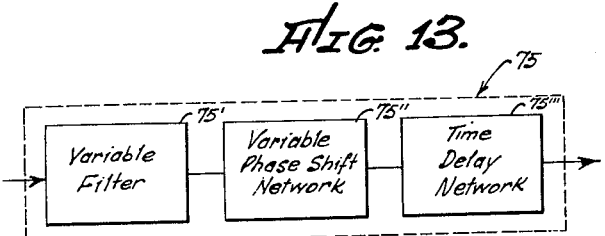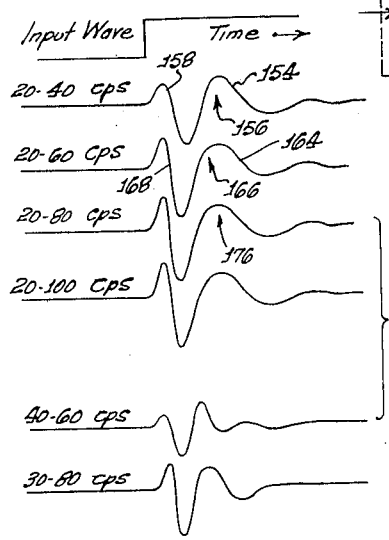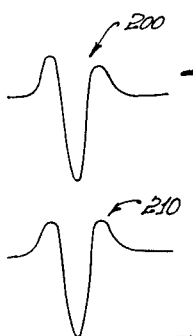

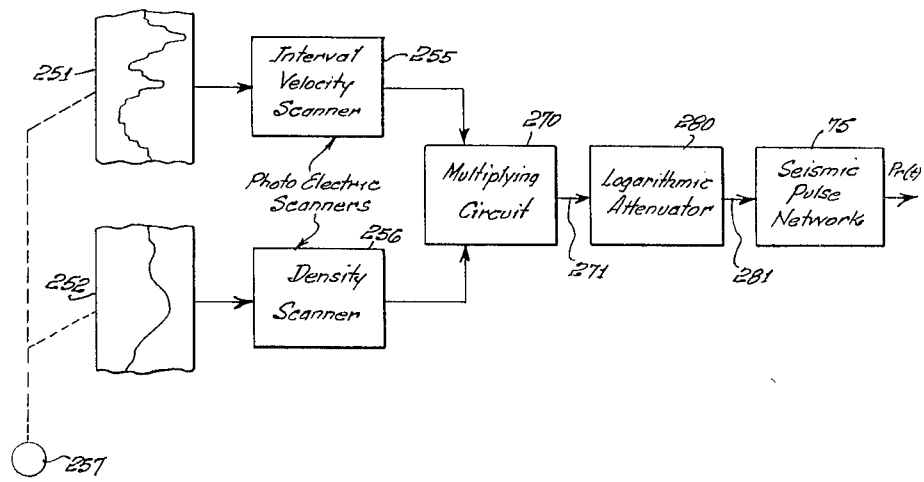
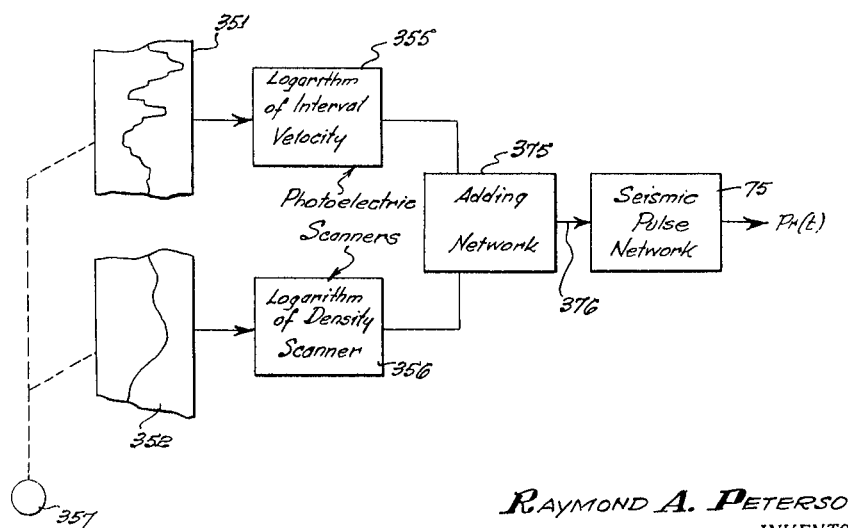

RAYMOND A. PETERSON,
INVENTOR.
BY
ATTORNEY

March 15, 1966  R. A. PETERSON  3,241,102
SYSTEM FOR SYNTHESIZING SEISMOGRAMS FROM WELL LOGS
Original Filed July 5, 1955  14 Sheets-Sheet 11
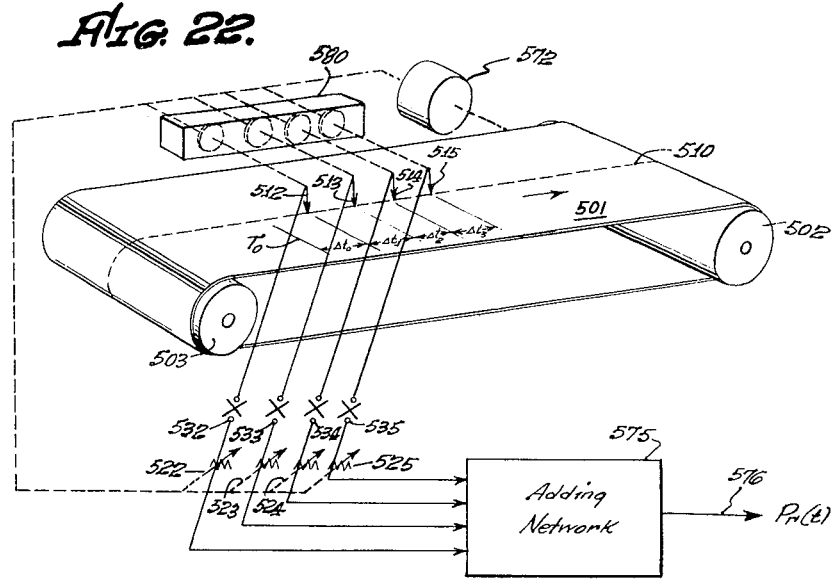
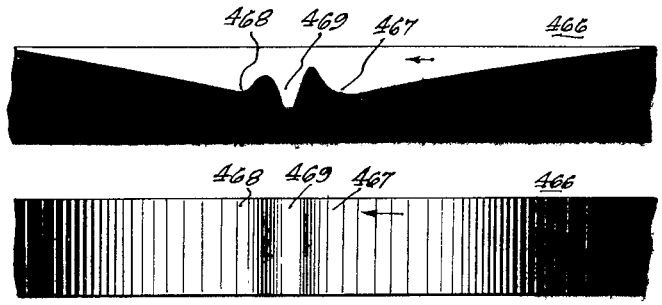
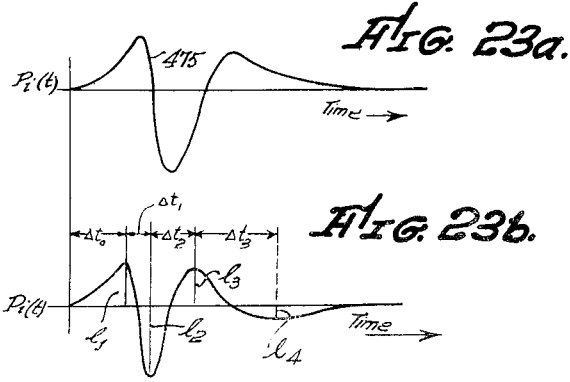
RAYMOND A. PETERSON,
INVENTOR.

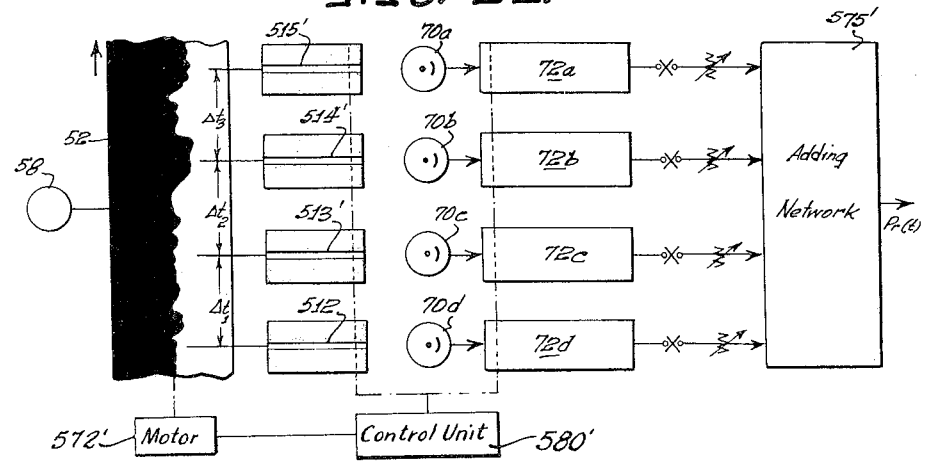
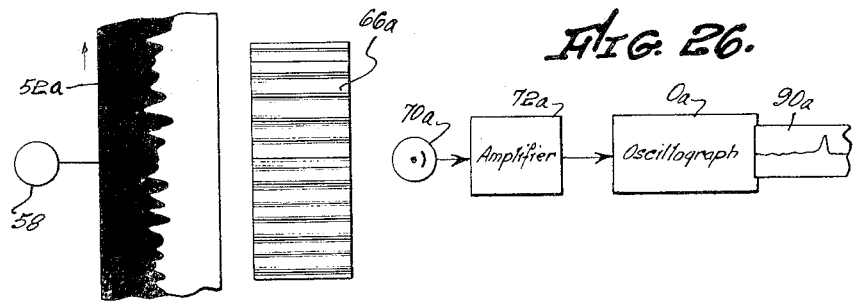
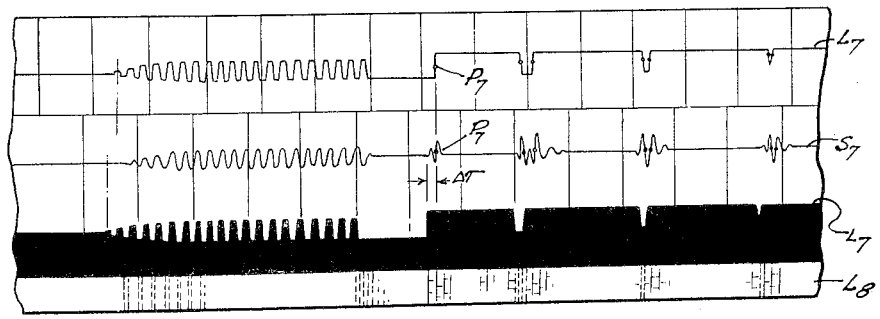

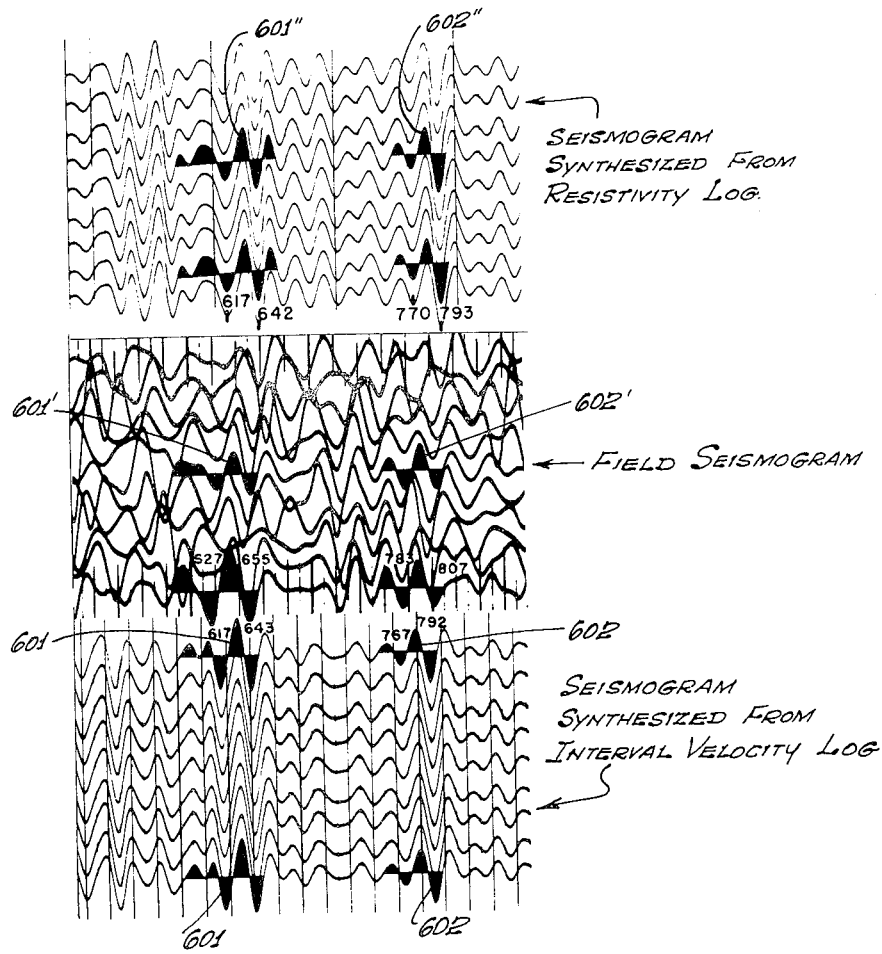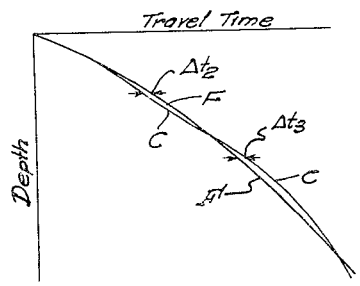

March 15, 1966 R. A. PETERSON 3,241,102
SYSTEM FOR SYNTHESIZING SEISMOGRAMS FROM WELL LOGS
Original Filed July 5, 1955 14 Sheets-Sheet 14
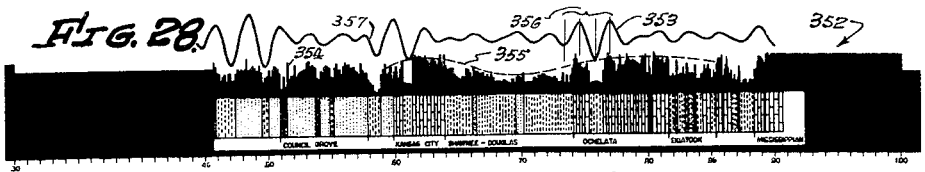
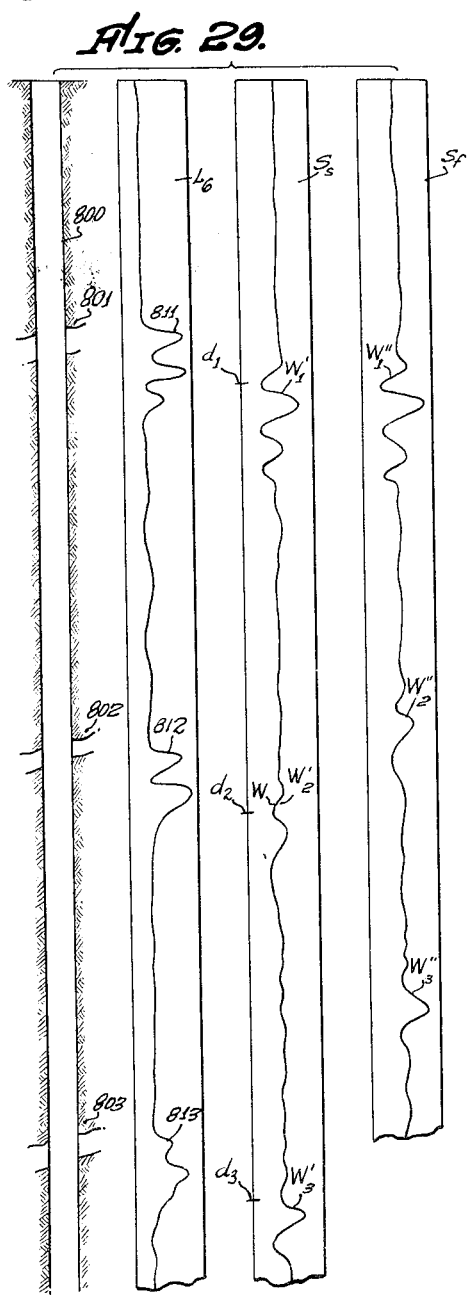
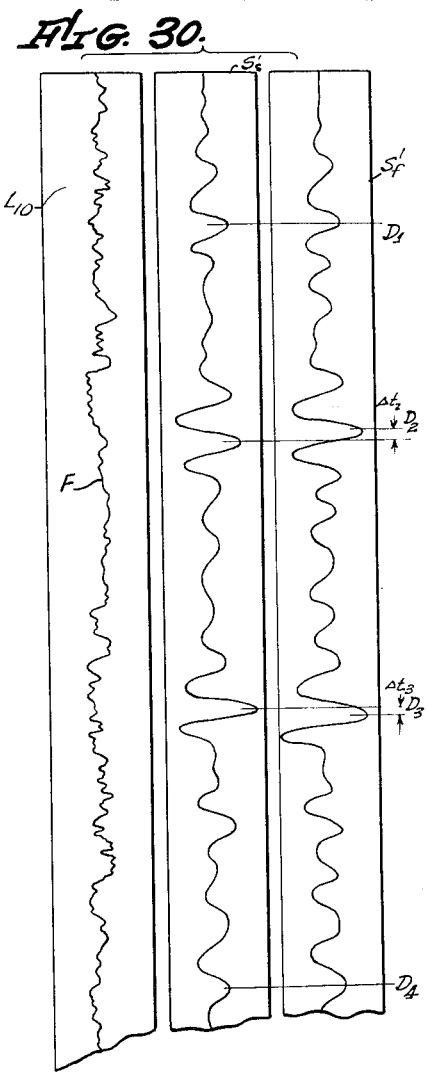
RAYMOND A. PETERSON,
INVENTOR.
BY Reed Lawlor
ATTORNEY.

United States Patent Office 3,241,102
Patented Mar. 15, 1966

3,241,102
SYSTEM FOR SYNTHESIZING SEISMOGRAMS FROM WELL LOGS
Raymond A. Peterson, Altadena, Calif., assignor, by mesne assignments, to United Geophysical Corporation, Pasadena, Calif., a corporation of Delaware
Original application July 5, 1955, Ser. No. 519,801, now Patent No. 3,011,582, dated Dec. 5, 1961. Divided and this application Apr. 3, 1961, Ser. No. 125,020
24 Claims. (Cl. 340—18)

This application is a division of copending patent application Ser. No. 519,801, filed July 5, 1955, now Patent No. 3,011,582.

This application relates to improvements in geophysical prospecting systems and particularly to improved systems for use in connection with the interpretation of well logs and more particularly to improved systems for correlating data obtained in various kinds of well logging systems with the data obtained by means of reflection seismograph systems.

In reflection seismograph surveying, as commonly practiced, seismic waves are generated at various seismic wave generating stations adjacent the surface of the earth. Such waves may be generated at each of such positions, for example, by detonation of a charge of explosive at a shot point located at the bottom of a shallow borehole. The waves so generated at each station travel downwardly through the earth. Upon encountering various subterranean strata or other discontinuities in the formations beneath the surface of the earth the waves are partially reflected and are returned to the surface. There the waves are detected by means of seismic wave detectors located at various seismic wave receiver stations and records are made of the returned waves. These records are generally in the form of multiple trace oscillograms in which each trace represents the motion of the earth at a corresponding receiving point, the displacement of the trace being displayed as a function of the seismic wave travel. The depth and the strike and the dip of strata that have reflected the waves may be determined by well known methods from (1) the times required for the waves to travel from each of the seismic wave generator stations to the strata from which the waves are reflected and then to the seismic wave receiver stations, (2) the geometrical arrangement and relative spacing of the seismic wave receiver stations and the shot point, and (3) the velocity with which the seismic waves travel. The data so obtained are employed to ascertain the nature and structure of the subterranean formations. Knowledge of such formations is employed to determine where deposits of petroleum are most likely to be found in the area surveyed. Ordinarily, in reflection seismic surveying, when a survey is made even though the contours representing relative depths of various parts of subsurface formations may be accurately known, it is not at all easy to correlate individual waves recorded on a seismogram with specific subsurface formations. Furthermore, when the character of an individual reflection recorded on a seismogram varies throughout the area under investigation, it is very difficult to ascertain the nature of the corresponding change that has occurred in the characteristics of the formations that have produced the reflection. It is, therefore, very desirable to produce improved methods of correlating the individual formations and changes in the character of such formations with individual seismic waves and with changes in the character of such seismic waves.

This invention relates particularly to systems for correlating logs of wells with seismograms produced in areas in the neighborhoods of the wells. As explained hereinafter, best results are obtained by employing the log of the logarithm of acoustic impedance as a function of seismic wave travel-time. However, the invention can also be practiced by employing interval-velocity or even the resistivity and even other formation characteristics as the variable in the log.

According to this invention, a system is provided for converting a well log into a seismic wave trace. More specifically in accordance with this invention, after certain preliminary treatment or conversion, a well log is filtered by feeding it through a pulse generator to produce a seismogram trace of the type that would be produced in making a record of seismic waves with a reflection seismograph at the location of the well from which the log was obtained. In the best mode of practicing the invention, well log data are incorporated in a phonographically reproducible well log such as a well log of the variable area type that is a log in which the width of the log varies along the length of the log in accordance with variations in characteristics of the earth in the neighborhood of the well along the length of the well. For convenience, the record so produced is called a synthesized or synthetic seismogram. By comparing synthetic seismograms produced by this system with actual field seismograms obtained in the same area, it is possible to identify specific seismic waves recorded in field seismograms as reflections from specific readily identifiable strata or groups of strata.

Though the invention is described hereinafter particularly with reference to the production of synthetic seismograms from acoustic impedance logs, it has been found that even when other logs are subjected to treatment in accordance with this invention they too may be converted into synthetic seismograms which bear a marked resemblance to actual seismograms obtained in the same area. This similarity probably arises from the fact that there is often a close correlation between the acoustic impedance of various formations with other characteristics of such formations.

In accordance with this invention, interval-velocity logs and other logs may be altered systematically in the laboratory, such as by removal or insertion of sections therein in order to ascertain what effect the truncation or intrusion of various strata may have on actual seismograms obtained in an area under investigation. Furthermore, by way of example, interval-velocity logs may be altered systematically such as by arbitrarily changing velocities at specific depths on the logs in order to determine what effect lithologic changes in a stratum or in a series of strata may have on seismograms produced at various points throughout an area. In these ways stratigraphic changes may be ascertained without the necessity of drilling large numbers of wells over the area under investigation.

The novel features that are considered characteristic of the invention are set forth in the appended claims. The invention itself and the principles upon which it is based, however, both as to its organization and its method of operation, together with various features thereof, will best be understood from the following operation of the principles of the invention and the following description of a specific embodiment thereof when read in connection with the accompanying drawings in which:

FIG. 4 is a diagram illustrating schematically how a field seismogram would be produced by seismic wave reflections at discreet interfaces;

FIG. 5 is a diagram schematically illustrating how a field seismogram would be produced by reflections from a continuously varying underground formation;

FIG. 8 is a schematic diagram of an embodiment of the invention;

FIGS. 8a and 8b represent logarithmic slits;

FIG. 10 is a diagram showing a system for recording a primary seismic wave pulse and a field seismogram;

FIG. 11 is a graph of the relative frequency response characteristics of the seismic pulse network and the remainder of the seismograph system;

FIG. 12a is a series of curves illustrating typical output waveforms obtained from seismic pulse networks;

FIG. 12b is a pair of curves illustrating two theoretical types of seismic waveforms occurring in viscous media;

FIG. 13 is a block diagram of a seismic wave pulse network;

Figure 14:
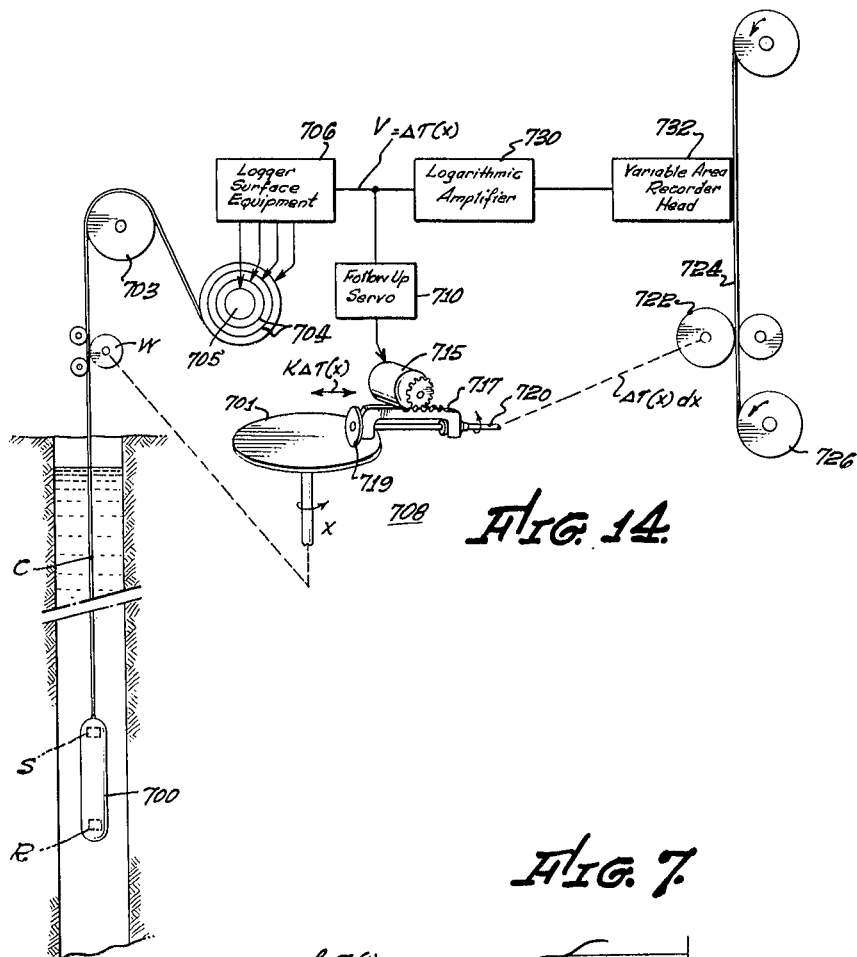
Figure 17:
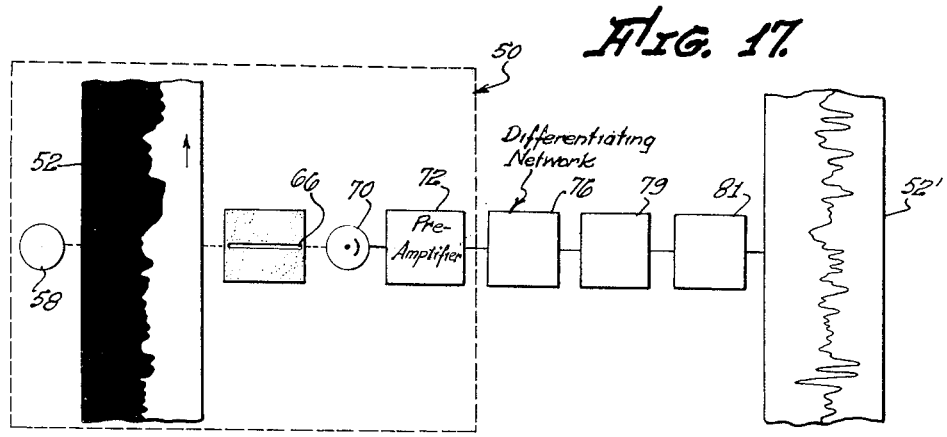
Figure 18:
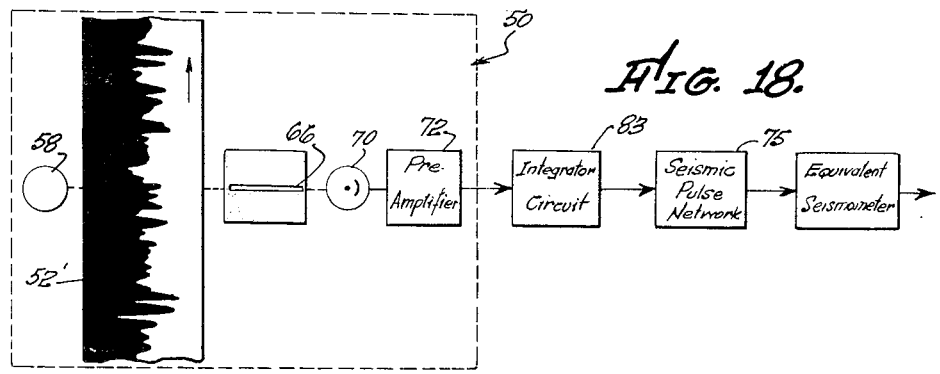
Figure 19:
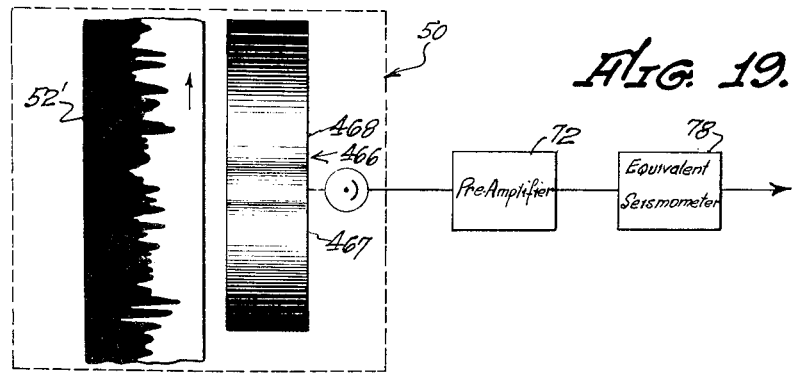

FIG. 14 schematically illustrates a system for automatically producing film strip graphs during a logging operation;

FIG. 15 illustrates schematically a system for synthesizing seismograms from both interval-velocity and density data;

FIG. 16 illustrates schematically another system for synthesizing seismograms from both interval-velocity and density data;

FIG. 17 is a schematic diagram of a system for converting a well log of a characteristic into one representing a log of the derivative of the characteristic;

FIG. 18 is a schematic diagram of part of a system for synthesizing a seismogram from a derivative log;

FIG. 19 is a schematic diagram of part of a system utilizing a waveform aperture;

FIG. 20 illustrates a variable density waveform slit which may be employed in practicing the invention;

FIG. 21 illustrates a variable area waveform slit which may be employed in practicing the invention;

FIG. 22 is a schematic diagram of a magnetic tape apparatus suitable for use in the invention;

FIGS. 23a and 23b are diagrams used in explaining how the magnetic playback heads of FIG. 22 are adjusted;

FIG. 24 is a schematic diagram of a multiple slit system;

FIG. 25 illustrates how parts of seismograms synthesized from electrical resistivity and interval-velocity data correlate with an actual field seismogram;

FIG. 26 is a schematic diagram of a mechanical correlator;

FIG. 27 is a diagram of a series of logs employed to explain certain features of the invention;

FIG. 28 is a diagram illustrating the close correlation of a synthetic seismogram with a well log;

FIGS. 29 and 30 are schematic diagrams illustrating the method of employing this invention in making vertical velocity surveys; and FIG. 31 is a graph of interval time versus depth.

*General description of seismogram synthesis system*

This invention is based upon the discovery that certain functional operations can be performed on data obtained from well logging operations and the resulting transformed information may be used as the basis for synthesizing reflection seismograms.

In one method employed to practice the invention, an interval-velocity log is first produced in which interval velocities at various depths are displayed as a linear function of total seismic wave travel-time. It is to be noted that such a log would represent a log of acoustic impedance if the density of the earth was uniform throughout the depth of the well.

In order to produce such an interval-velocity versus travel-time log, two preliminary logs are first obtained. One is a log of travel-time versus depth, the other is a log of interval-velocity versus depth. From these two logs, or if preferred the log data from which they are produced, the desired interval-velocity versus travel-time log is produced.

Figure 1:
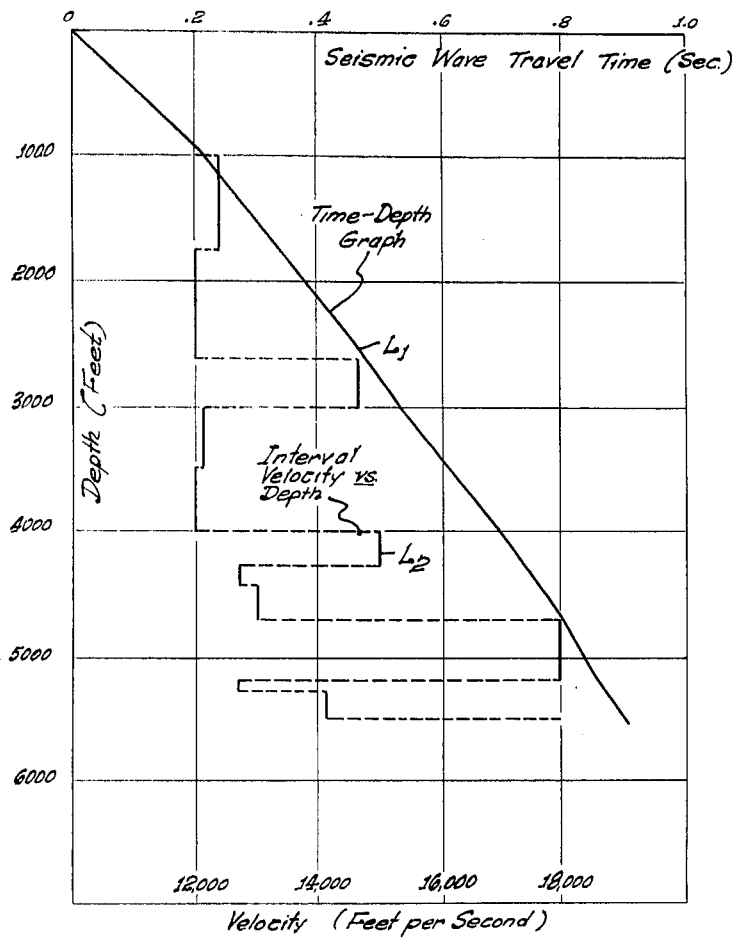
FIGURE 1 is a graph showing how seismic wave travel-time and interval velocity over large depth intervals vary with depth.

Preliminary logs for use in producing an interval-velocity versus travel-time log are illustrated in FIGURE 1. Referring to this figure, it will be noted that the log $L_1$ represents a plot of travel-time versus depth, travel-time being plotted as abscissae and depths being plotted as ordinates. Likewise, log $L_2$ represents a plot of interval-velocity versus depth, interval-velocities being plotted as abscissae and depths being plotted as ordinates. The same ordinate scales are employed in both logs, so that it is a simple matter to correlate the interval velocity at any depth with the time required for seismic waves to travel to that depth.

The travel-time versus depth log $L_1$ may be obtained in numerous ways. For example, a series of charges of explosives may be detonated in a shot hole adjacent the top of a well and the time required for waves to travel through the surrounding formations to various depths in the well may be determined by locating a hydrophone at the various depths in the well as each shot is taken and measuring the time required for the waves to travel from the respective shots to the hydrophone while at each of the corresponding depths.

Likewise, continuous interval-velocity logs may be determined in numerous ways. In one method, for example, seismic waves may be successively generated at various depths in a well and the difference in the time required for the waves to travel to hydrophones maintained at fixed distances from the source of the waves may be measured at the different depths. The interval velocity is computed by dividing the inter-hydrophone distance by the suitably corrected interval time at each depth. Such a system has been disclosed in detail and claimed in copending United States patent application Ser. No. 462,062, filed Oct. 13, 1954, now Patent No. 3,170,136. Other systems for determining interval-velocity logs have been described by Summers and Broding in an article entitled "Continuous Velocity Logging," published in Geophysics, vol. XVII, No. 3, July 1952, pages 598 to 614, and another by C. B. Vogel in an article entitled "A Seismic Velocity Logging Method," published in the same issue at pages 586 to 597.

In either case, the travel-times so determined and the continuous interval velocities so determined may be tabulated as a function of depth or they may be plotted as a function of depth as illustrated in FIG. 1.

Figure 2:
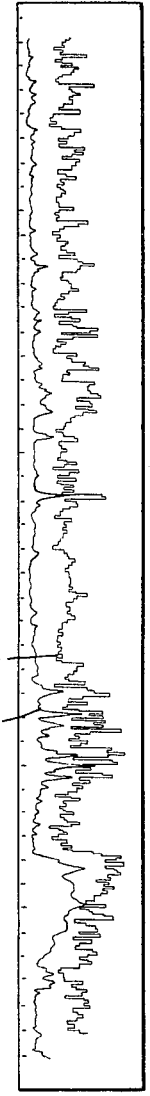
FIG. 2 represents well logs of interval-velocity and resistivity.

In practice, interval-velocity measurements should be made at different depths over small intervals of distance less than about 20 feet or 10 feet in order to be most useful in this invention. Thus, wheras the interval-velocity log $L_2$ illustrated in FIG. 1 shows measurements over intervals of at least 75 feet, a much more detailed log is normally required for use in this invention. In FIG. 2, there is illustrated an interval-velocity log $L_3$, in which interval velocity over small intervals of about 10 feet is shown plotted as a function of depth. In the same figure, a resistivity log $L_4$ for the same well is plotted over the same depth range. It will be noted that there is a striking similarity between these logs. Advantage of this fact is taken in accordance with this invention to produce synthetic seismograms from resistivity logs as well as from interval-velocity logs.

Figure 3:
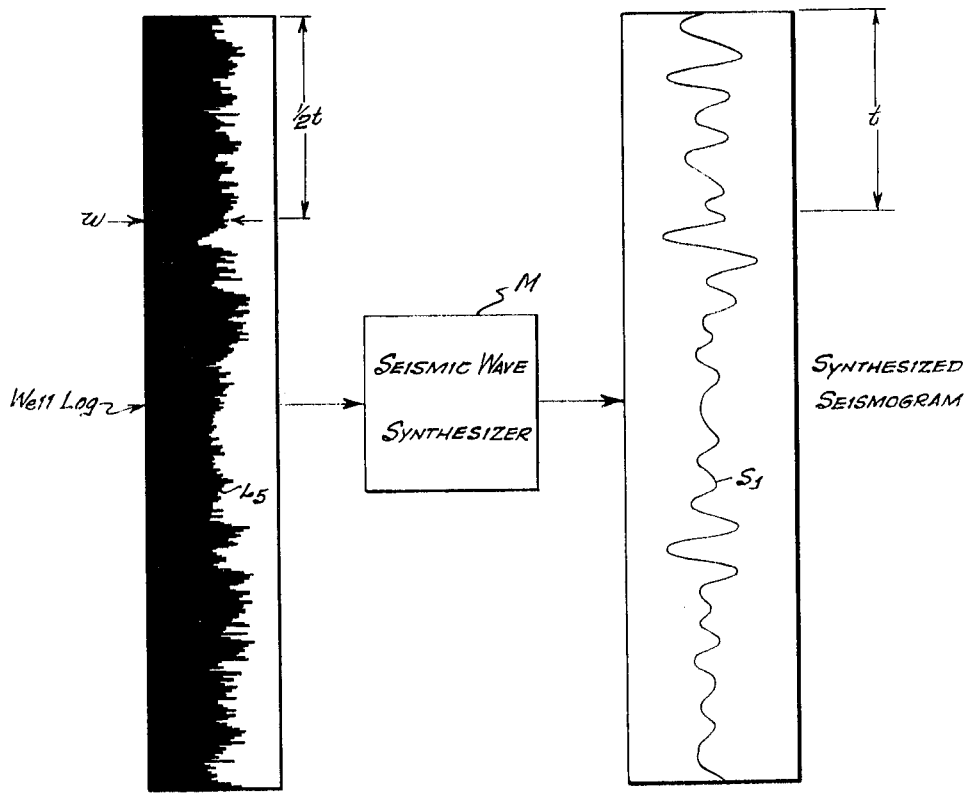
FIG. 3 shows a schematic embodiment of the invention.

In preparing an interval-velocity log to use for producing a synthetic seismogram, a phonographically reproducible well log in the form of a variable area film strip log $L_5$, as illustrated in FIG. 3, is prepared. As will be more fully explained hereinafter, in the best logs useful in this invention, the lateral width variable area, or opaque part, of the record $L_5$ is made proportional to the logarithm of the interval velocity rather than proportional to the interval velocity itself, while the coordinate along the length of the variable area log is made proportional to the total corresponding seismic wave traveltime rather than proportional to the depth. Thus, in the variable area log of FIG. 5, the width $w$ of the opaque part of the variable area record at any point along its length is proportional to the logarithm of the interval velocity at the depth to which seismic waves travel from the shot point to a receiver in a time T. Such a log is readily prepared from the data of the log $L_1$ of FIG. 1 and the data of the log $L_3$ of FIG. 2. A method for producing such a log automatically while a well is being logged is described in detail hereinafter.

In accordance with this invention, the variable area log $L_5$ is fed into a specially designed seismic wave synthesizer or transducer M, where the variable area log $L_5$ is scanned to produce a series of electrical signals which are combined to produce a synthetic seismogram $S_1$ as illustrated generally in FIG. 3.

As more fully explained hereinafter, the variable area film strip log $L_5$ is scanned in a phonographic reproducer operated at constant speed. The output from the reproducer is filtered by a filter which simulates the action of a seismic wavelet propagated into the subsurface formations by the explosion of the dynamite charge during the making of a reflection seismogram in the field. The resulting output signal from the electrical filter network is recorded as a function of time and becomes the synthesized or predicted seismogram $S_1$ shown in FIG. 3 in which the trace represents the manner in which the velocity of the ground varies as a function of travel-time at the point where the reflected waves are received. In FIG. 3, the interval-velocity log $L_5$ and the synthetic seismogram $S_1$ are both shown as functions of wave travel time and are placed side-by-side with time increasing from the top of both records to the bottom thereof to facilitate visual correlation of corresponding parts of the records. It will be understood that the one-way travel-time of the waves from the shot point to the various strata is one-half of the two-way travel-time from the shot point to a reflecting stratum and return to the shot point. This relationship is indicated in FIG. 3, where the time interval $t$ on the syntheic seismogram $S_1$ representing two-way reflection time occupies the same length of record as the time interval labeled $\tfrac{1}{2}t$ corresponding to one-way travel-time on the well log $L_5$.

For convenience hereinafter a well log exhibiting a well formation characteristic plotted as a function of travel time is sometimes referred to as a travel-time well log, and one which exhibits the well formation characteristic plotted as a function of depth is sometimes referred to as a depth well log.

It is significant in the method of this invention that a synthesized or predicted reflection seismogram is produced which is free from all surface disturbances, multiple reflections, extraneous noises, etc. The seismogram is, in effect, a true picture of a simple reflection process which is to be expected from the nature of the physical characteristics of the formations through which the borehole was drilled.

*General theory of seismogram synthesis*

It is well known that a plane compressional elastic wave incident normally upon an interface exhibiting changes of seismic-wave velocity characteristics or density, or both, will be partially reflected therefrom. In fact, under these ideal conditions it is possible to calculate the reflection coefficient which, when multiplied by the original incident wave function, determines the amplitude of the reflected wave relative to the incident wave. The remaining portion of the original wave passes through the interface and is propagated further. More particularly, if the incident wave is originally traveling in a medium having an acoustic impedance $Z_1$ defined as the product of the density $p_1$ and the acoustic velocity of propagation $c_1$, and if the other medium just on the opposite side of the interface is defined by corresponding symbols having the subscript 2, then the reflection coefficient $R_x$ is defined by $$_xR = \frac{\rho_2 c_2 - \rho_1 c_1}{\rho_2 c_2 + \rho_1 c_1} = \frac{Z_2 - Z_1}{Z_2 + Z_1} \quad (1)$$

It should be observed that the algebraic sign of the reflection coefficient $R_x$ is determined by the relative magnitudes of the acoustic impedances $Z_1$ and $Z_2$ adjacent the interface.

A diagrammatic representation of the physical process of the reflection of seismic waves at acoustic interfaces is shown in FIG. 4. A combination density-velocity, or acoustic impedance, log exhibiting distinct contrasts at three different depths is shown at the left of the figure. The horizontal coordinate Z of this log is proportional to the product of the density $p$ and the characteristic velocity $c$ of the formation. This combination of the elastic properties of the formation is plotted as a linear function of vertical travel-time as shown. It is assumed that a simple shot pulse in the form of a primary seismic pulse or wavelet 1 enters the medium at point 2 of the surface 6. As the incident wavelet 1 propagates downwardly, it strikes the interface 3 of the density-velocity characteristic at time $\tfrac{1}{2}t_3$, thus being partially reflected and partially transmitted. The reflected wavelet 3' exhibits the same "polarity" but has a different amplitude than the incident wavelet 1. The remaining portion of the incident wavelet 1 continues to travel past interface 3 and encounters interface 4 at time $\tfrac{1}{2}t_4$. Again a fraction of the incident wavelet is reflected upwardly, thus forming reflected wavelet 4'. Similarly, a further fraction of the remaining wavelet is reflected upwardly at interface 5 at time $\tfrac{1}{2}t_5$, thus forming reflected wavelet 5'. In this case, however, interface 5 exhibits a decrease in acoustic impedance and therefore the reflected wavelet 5' is inverted.

To schematically illustrate the resultant "seismogram," a horizontal time scale is indicated commencing at the time $t_0$ of the initiation of the incident wavelet 1. Each of the reflected wavelets is plotted at a position on the scale corresponding with the time of arrival of the wavelet at the surface. In this way, a simple "seismogram" 7 is formed showing the incident wavelet 1 occurring at time $t_0$ and each of the reflected wavelets 3', 4', and 5' arriving at the surface at times $t_3$, $t_4$, and $t_5$ respectively.

Several points may be observed from this simple illustration. In accordance with Equation 1, the amplitudes of the reflected waves are proportional to a function of the change in acoustic impedance Z of the density-velocity log. Secondly, the "polarity" of the reflected wave is determined by the direction of change of the acoustic impedance Z. Note that the interfaces 3 and 4 represent an increase in the value of Z, while interface 5 represents a decrease. Consequently, reflections 3' and 4' each begin with an initial downward swing while reflection 5' begins with an initial upward swing. And thirdly, the time required for a wave to travel from the shot point to a reflecting interface and return is twice the travel-time required for a wave to travel from the shot point to the reflecting interface. The former travel-time is measured in a reflection seismic prospecting system while the latter is measured in a well shooting system. It is to be noted that the interfaces shown in FIG. 4 may be designated generally by the integer $j$, and that the formation directly above the interface $j$ has an acoustic impedance $Z_j$, while the formation directly beneath the interface $j$ has an acoustic impedance $Z_{j+1}$, and that the wavelet reflected from the $j$th interface is $j'$.

The density-velocity log illustrated in FIG. 4 is, of course, highly simplified. In practice, the distribution of the values of the acoustic impedance with depth is typically quite irregular, as schematically illustrated in FIG. 5. In view of the complexity of this illustration, one may ask the general question, "At what time are seismic reflections to be expected on seismograms recorded at the well location, as predicted from the observed variations of velocity and/or density with depth at that location?" Simple inspection of the density-velocity log reveals that the answer to this question is quite complicated because of the highly irregular distribution of acoustic impedance. However, by means of this invention, predicted or synthesized seismograms can be produced directly from the density-velocity, or acoustic impedance, logs.

In accordance with the present invention, the density-velocity log of FIG. 5 is considered to be made up of a large number of small discrete discontinuities or steps 10. Each of the steps 10 exhibits a definite reflection coefficient and gives rise to a small reflection wavelet which returns to the surface 6. The total reflected wave on the resultant seismogram 7' is then made up of the linear summation of all of the reflected wavelets.

Further, in accordance with the invention, the density-velocity versus depth log of a well is transformed into a new form in which the logarithm of the density-velocity variations is plotted as a function of the total seismic wave travel-time instead of the depth. This transformed log is then converted to a proportional electrical signal in which the amplitude of a voltage or current varies as a function of time in the same way that the logarithm of the impedance varies as a function of travel-time. It is understood, of course, that the time scales of the voltage wave need not be the same as the travel-time scale. However, unless stated otherwise, these two scales are assumed to be the same in the description that follows. The signal produced is applied to the input of a "seismic-pulse" or "synthesizing" network in the synthesizer M. The characteristics of the network are adjusted so that the transient produced at the output of that network when a step function signal is applied to the input has the form of the primary seismic pulse which is traveling downwardly through the formations. In this way, the step-rise characteristic of the transformed density-velocity log acts as a series of successive input step functions of varying size, polarity, and spacing. The output of the network is then made up of the linear summation of all of the "reflection" wavelets applied at the proper times and with the proper phases and amplitudes. Thus the desired synthesized seismogram is obtained.

This process has been diagrammed schematically in FIG. 3, which shows the transformed acoustic well log (as a function of time) as applied as an input signal to the seismic pulse network. The resulting output is the desired record, or synthetic seismogram, representing the sum of reflected seismic waves arriving at the surface. In FIG. 3, the output signal has been shifted by the amount of time necessary to correct for the time delay introduced by the seismic pulse network. As will be seen later, by shifting a field seismogram relative to a travel-time well log by such a time delay, the correlation of the field seismogram with the well log is facilitated. In this way the close correlation between the general waveforms of the input and output signals is brought to light.

*Mathematical analysis*

A more detailed explanation of the mathematical theory underlying the invention will now be made since this analysis will aid in understanding the invention. In carrying out the analysis certain simplifying assumptions are made, even though the general results of the theory apply under a wide variety of conditions. Conditions assumed to exist solely for the purpose of developing a simple theory are:

(1) The media are considered to be horizontally stratified and to exhibit no changes in elastic properties in the horizontal direction.

(2) Multiple reflection phenomena are disregarded.

(3) The amplitude and shape of the incident seismic wavelet are considered to be invariant with depth.

(4) The incident wave is considered to be plane and infinite in extent, i.e., spherical divergance of the wave is neglected.

In practice, assumptions (1) and (4) are closely approximated in many areas. The effects of attenuation of seismic waves with depth (assumption (3)) are effectively overcome in practice through the use of seismograph amplifiers employing automatic gain control systems such as automatic volume control systems and "expander" gain controlling systems and combinations thereof. Account of changes in shape may be taken in practice by varying the characteristics of the seismic pulse network as a function of travel-time. Absence of the effects of multiple reflection phenomena will be shown to be very advantageous.

By employing the expression for the reflection coefficient $R_x$ given by Equation 1, the process of seismogram formation illustrated schematically in FIGS. 4 and 5 may be defined in mathematical terms. Assume, with respect to FIG. 4, that an arbitrary plane pressure wave $P_i(t)$ is propagated vertically downward from the surface thus striking the interfaces at normal incidence. The incident wave $P_i(t)$ travels at a velocity $c$ and arrives at the first acoustic impedance interface 3 after an appropriate travel-time $\frac{1}{2} t_3$. Some of the incident energy travels through the interface 3 while a fraction is reflected upwardly by the interface. More particularly, in accordance with Equation 1 the reflected pressure wave arriving at the surface is given by $$P_r(t) = \left[\frac{Z_4 - Z_3}{Z_4 + Z_3}\right] P_i(t - t_3) \qquad (2)$$

In this equation $Z_3$ and $Z_4$ are the values of the acoustic impedance on the upper and lower sides of the interface 3 respectively as shown in FIG. 4. Time $t_3$ is the total travel-time of the initial part of the wave from the surface 6 to the interface 3 and back again to the surface. It is seen that the quantity within the brackets is the reflection coefficient $R_x$ for interface 3. The reflected wave represented by Equation 2 is propagated upwardly, ultimately arriving at the surface 6 where it is recorded as wavelet 3' on the seismogram 7.

The remaining part of the incident energy which passed through interface 3 continues to travel downwardly and ultimately encounters the interface 4 where a further fraction of the incident energy is reflected upwardly, the remainder traveling through interface 4 in a downward direction. The reflected wavelet from interface 4 has the same form as that reflected from interface 3 and is given by Equation 2 where $t_3$ would assume a new value $t_4$ and the subscripts 3 and 4 of the acoustic impedance terms $Z$ would be replaced respectively by the subscripts 4 and 5. Likewise, the energy which passes through interface 4 continues to travel downwardly ultimately to encounter interface 5 where the reflection process is again repeated. At the latter interface it should be noted that the acoustic impedance below the interface has a lower value than that above the interface and hence from Equations 1 or 2, the sign of the reflection coeficient $R_x$ becomes negative. This negative sign indicates that wavelet 5' reflected from interface 5 is inverted in phase or "polarity" as compared to the incident wave, all as shown schematically in FIG. 4.

An expression of the form of Equation 2 may be written with additional terms and suitable time delays between the terms to express the sum total of the reflected wave information received at the surface 6. Such an expression will have the appearance of Equation 3, $$P_r(t) = \frac{Z_4 - Z_3}{Z_4 + Z_3} P_i(t - t_3) + \frac{Z_5 - Z_4}{Z_5 + Z_4} P_i(t - t_4) + \frac{Z_6 - Z_5}{Z_6 + Z_5} P_i(t - t_5) \quad (3)$$

where the various symbols have the meanings indicated in Equation 2. It will be understood that the expression $P_i(t)$ represents the manner in which the pressure of the down-going wave varies as a function of time and that, generally speaking, the expression $P_i(t - t_j)$ represents the manner in which the pressure of the down-going wave varies at the $j$th interface. All of the expressions $P_i(t)$, $P_i(t - t_3)$, $P_i(t - t_4)$, etc., have the same wave form, but occur at different times. The down-going wave incident on the $j$th interface is $P_i(t - t_j)$. This wave has the same form as the original way $P_i(t)$, but is delayed by a time $t_j$, the time required for the original wave to travel from point 2 to the corresponding $j$th interface, and from there to the surface. In Equation 3, the expression $P_r(t)$ represents the manner in which the pressure of the upwardly-traveling train of reflected waves that is received at a point near the surface of the earth varies as a function of time. In all of these cases, the expressions $P(t)$, $P_i(t - t_j)$, and $P_r(t)$, represent the waves arriving at the surface, the time $t$ being the total time elapsed since the wave traveled downwardly past the point 2. In these expressions, no account is taken of changes in amplitude of the various waves caused either by reflection, or by other attenuation. It is to be noted that in Equations 2 and 3

$$P_i(t - t_j) = 0 \quad (4)$$

when $$t - t_j = 0 \quad (5)$$

where $$j = 3, 4, 5, \text{etc} \quad (6)$$

As previously mentioned, the actual variation of acoustic impedance Z as a function of depth is found to be an extremely variable characteristic as illustrated in FIG. 5. It can be seen, therefore, that to carry out the process indicated by Equation 3 for any practical case would be an extremely laborious process indeed.

However, at this point a great simplification is introduced, the discovery of which made the present invention possible. More particularly, in Equation 1 it is noted that for small differences $\Delta Z$ between the values $Z_1$ and $Z_2$, the reflection coefficient at the depth $x$ is approximately given by the expression $$R_x = \frac{\Delta Z}{2Z} \cong \frac{dZ}{2Z} \quad (7)$$

The latter function of Equation 7 is recognized as one-half the differential of the natural logarithm of the acoustic impedance Z. Thus, $$R_x = \frac{dZ}{2Z} = \frac{d(\ln Z)}{2} \quad (8)$$

By means of this approximation, then, Equation 2 may be rewritten in the following form:

$$P_r(t) = \frac{d(\ln Z)}{2} P_i(t - t_3) \quad (9)$$

This equation expresses the fact that the wave reflected from an acoustic interface is proportional to one-half of the corresponding incremental change in the value of the logarithm of the acoustic impedance Z.

In using this expression, the earth is visualized as being made up of a large number of rock layers 11 (FIG. 5), very thin compared with the shortest seismic wave lengths of interest, and each having an acoustic impedance that is generally somewhat different from those of the adjacent layers above and below it. The downwardly traveling incident wave or seismic pulse is partially reflected from each interface between successive layers and the seismic wave train received at the surface is the sum of all of these small reflections. It should be noted that the logarithmic approximation of Equation 8 affords a significant simplification since it vitiates the need for any step-by-step calculation procedures which would otherwise be necessary in determining the values of the reflection coefficient corresponding to the multitude of rock layer interfaces.

It is evident that the approximation inherent in the transformation from Equation 2 to Equation 7 becomes better as the size of the discontinuity decreases. In the limit for which the acoustic impedance Z becomes continuous with no step discontinuities whatsoever, the approximation is exact. In dealing with practical well velocity data, however, the curve of the acoustic impedance Z often assumes a discontinuous step-wise characteristic and for this case it is valuable to know the extent of the approximation involved in Equations 7, 8, and 9. In in order to make this evaluation, consider the following:

The equation is first transformed into a dimensionless form by defining $$\mu = \frac{Z_{n+1}}{Z_n} \quad (10)$$

where $Z_n$ and $Z_{n+1}$ are the values of the acoustic impedance immediately above and below a particular interface. By making this substitution into Equation 1, the expression for the reflection coefficient $R_x$ becomes $$R_x = \frac{\mu - 1}{\mu + 1} \quad (11)$$

From Equation 8 the approximation for the reflection coefficient $R_x$ is written in the form $$R_x \cong \frac{d(\ln Z)}{2} \cong \frac{\Delta \ln Z}{2} = \frac{\ln Z_2 - \ln Z_1}{2} = \frac{\ln\left(\frac{Z_2}{Z_1}\right)}{2} = \frac{\ln \mu}{2} \quad (12)$$

A series expansion for the last term of Equation 8 is:

$$\frac{\ln \mu}{2} = \left[\frac{\mu - 1}{\mu + 1} + \frac{1}{3}\left(\frac{\mu - 1}{\mu + 1}\right)^3 + \frac{1}{5}\left(\frac{\mu - 1}{\mu + 1}\right)^5 + \ldots\right] \quad (13)$$

Inspection of Equation 13 reveals the fact that the first term of the expansion is, in fact, the exact value of the reflection coefficient $R_x$ as shown by Equation 11. All of the higher order terms therefore represent slight errors inherent in the repesentation of the reflection coefficient $R_x$ by the term $$\frac{\ln \mu}{2}$$

It is now apparent that the real approximation inherent in the transformation from Equation 2 to Equation 3 is the assumption that the value of $$\frac{\ln \mu}{2}$$

is given by only the first term of its series expansion.

Figure 6:
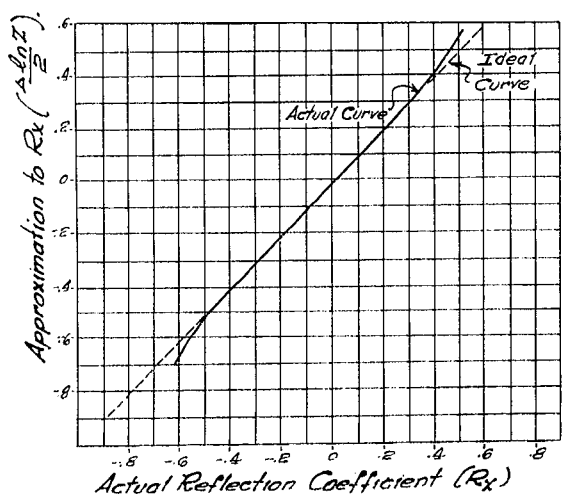
FIG. 6 is a graph illustrating the degree of similarity between the logarithmic approximation and the actual reflection coefficient.

In order to evaluate the practical limits of this approximation, a curve relating the actual reflection coefficient $$R_x = \frac{\mu - 1}{\mu + 1} \text{ (abscissa)}$$

and approximate reflection coefficient $$\frac{\ln \mu}{2} \text{ (ordinate)}$$

has been plotted in FIG. 6. It is seen that the correspondence between the two quantities is quite good for values of $\mu$ ranging from about 0.35 to about 2. As measured on the abscissa, these values correspond to reflection coefficients ranging from about $-0.48$ to about $+0.34$. In view of various other approximations which are inherent in the present invention, it is reasonable to extend the range of operation further than that just described. In fact, at a value of reflection coefficient of +0.5 the error is only 10%. Thus it is seen that the assumption that the quantity $$\frac{\Delta(\ln Z)}{2} = R_x = \frac{Z_2 - Z_1}{Z_2 + Z_1}$$

is valid for a large range of values. The curve of FIG. 6 may be employed to determine the actual range of the equivalents for any desired degree of accuracy.

Having thus shown that Equation 9 accurately represents the characteristics of wavelet reflected from any particular interface of acoustic impedance, it is now desired to continue further with a simple mathematical analysis in order to bring out clearly the principles underlying the invention.

Figure 7:
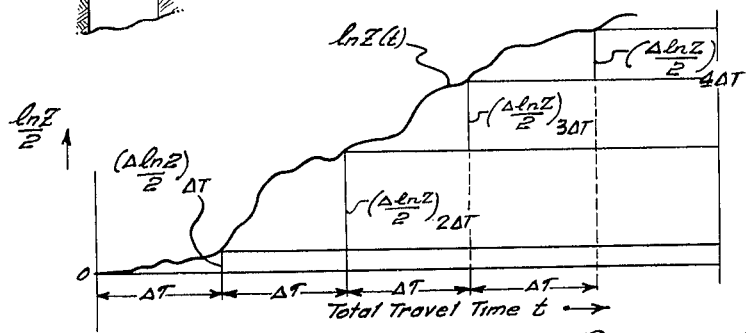
FIG. 7 is a diagram employed to explain the principles underlying the invention.

FIG. 7 illustrates a transformed strip graph for which the abscissa coordinate is the total seismic travel-time $t$, while the ordinate is proportional to the logarithm of the acoustic impedance $Z$. This form of graph can be obtained in different ways, but fundamentally the depth scale of the well log is converted into a total vertical travel-time scale by adding the small time intervals $\Delta t$ corresponding with each of the interval velocity values measured in the well and multiplying the result by two in order to account for travel in both directions.

In FIG. 7 the curve $\ln Z(t)$ is shown approximated by a series of step functions. The first is applied at time $t = \Delta\tau$. The second is applied at time $t = 2\Delta\tau$ and is of a height necessary to reach the curve ln $Z(t)$ at that point. Thereafter, appropriately sized step functions are added at equal intervals of time $\Delta\tau$ in order to approximate the curve. By making the size of $\Delta\tau$ sufficiently small, the approximation to the curve ln $Z(t)$ produced by the summation of step functions may be made arbitrarily close to the actual curve. In effect, each of the small step functions approximating the curve acts as an acoustic interface exhibiting a reflection coefficient proportional to the size of the step. Thus, each of these small steps produces a small reflection when the incident pressure wave $P_i(t)$ is propagated past it. By plotting the curve of FIG. 7 in terms of a total travel-time instead of in terms of depth, the ensuing analysis becomes highly simplified.

More particularly, in response to an initial applied plane pressure wave having a form $P_i(t)$, the curve of FIG. 7 produces a reflected wave train having the form given by $$P_r(t) = \frac{1}{2}\left[\Delta\tau P_i(t-\Delta)\left[\frac{\Delta(\ln Z)}{\Delta\tau}\right]_{\Delta\tau}\right.$$
$$+ \Delta\tau P_i(t-2\Delta\tau)\left[\frac{\Delta(\ln Z)}{\Delta\tau}\right]_{2\Delta\tau} + \cdots$$
$$\left.+ \Delta\tau P_i(t-n\Delta\tau)\left[\frac{\Delta(\ln Z)}{\Delta\tau}\right]_{n\Delta\tau}\right] \quad (14)$$

where $$\left[\frac{\Delta(\ln Z)}{\Delta\tau}\right]_{n\Delta\tau} = \text{the ratio of the incremental change in}$$
$$\ln Z \text{ to } \Delta\tau \text{ over the } n\text{th } \Delta\tau \text{ interval} \quad (15)$$

This quantity approaches the value of the derivative $$\frac{d(\ln Z(\tau))}{d\tau} = \ln' Z(\tau) \quad (16)$$

is $\Delta\tau$ becomes vanishingly small. Now let the quantity $$n\Delta\tau = \tau \quad (17)$$

Then if there is a limit it is given by $$P_r(t) = \frac{1}{2}\lim_{\Delta\tau \to 0}\sum_{\tau=0}^{\tau=t} P_i(t-\tau) \ln' Z(\tau) \Delta\tau \quad (18)$$

However, since ln $Z(t)$ actually varies continuously and also since the value of $\Delta\tau$ may be made arbitrarily small, the final expression becomes $$P_r(t) = \frac{1}{2}\int_0^t P_i(t-\tau) \ln' Z(\tau) d\tau \quad (19)$$

If any discontinuities occur at any point these may be taken into account by well known mathematical methods. This equation expresses the fact that when an initial pressure wave $P_i(t)$ is propagated downwardly through the changes of acoustic impedance $Z$ expressed by FIG. 7, the resulting reflected wave is an integral representing the continuous running cross-correlation between the derivative of the logarithm of the acoustic impedance $Z$ as a function of time and the initial applied pressure wave $P_i(t)$. It is to be noted that Equation 19 specifies only the reflected wave and does not include the seismic wave pulse that would travel directly to a geophone located very near the shot point. Equation 19 is in the form of a linear superposition integral. Moreover, the Expression 19 represents the voltage that would be observed at the output terminals of an electrical network whose step function response is $P_i(t)$ and which is driven by an input waveform having the characteristics shown in FIG. 7. Such a network automatically produces the integration indicated in Equation 19 and hence produces a record of seismic waves that would be reflected by a series of strata in which the acoustic impedance is varied in accordance with the function $Z$. Use is made of the discovery of this relationship in the synthesizing of seismic waves.

In one form of this invention, an electrical waveform which is proportional to the logarithm of the acoustic impedance as a function of the total seismic travel time $t$ is formed, and this waveform is passed through a network whose response to a step function has the same waveform $P_i(t)$ as the incident seismic pulse. The output from the network represents the instantaneous particle velocity of ground motion and is recorded by an oscillograph camera to produce the desired seismogram trace. In addition, this output wave is applied to a circuit that is the electrical equivalent of a geophone and a seismic amplifier and the resulting signal also is recorded in the form of a seismogram trace.

*Electrical filtering system*

In FIG. 8 there is illustrated a practical system which is particularly adapted to carrying out the process of synthesizing reflection seismograms in accordance with this invention. As previously mentioned, it is desirable to generate a signal which is instaneously proportional to the logarithm of the acoustic impedance of the formation surrounding the borehole as a function of the total vertical seismic wave travel-time. This process is accomplished in the system of FIG. 8 by means of the photoelectric scanner 50. This device scans or reads the instantaneous amplitude of the opaque portion of the variable area film strip graph 52 as the latter is rotated at a constant speed past a light source and scanning slit. The film strip graph 52 exhibits the characteristic of the curve of FIG. 7, the relative height transverse the length of the opaque portion at any instant being proportional to the logarithm of the acoustic impedance $Z$ of each particular stratum, and the coordinate along the length or periphery of the film 52 being proportional to the total travel-time of the seismic waves traversing the path from a shot point at the surface of the earth down to the particular strata and back to the surface again. Also shown on the strip graph 52 are step functions 54 which have accurately measured heights and are employed for calibration purposes as hereinafter described.

The photoelectric scanner 50 is constructed along the general lines of a device described by Washburn and Olesen in an article entitled "Transient Testing of Seismic Recording Apparatus," published in Geophysics, vol. V, No. 4, October 1940.

The strip graph 52 is supported on a transparent circular wheel 56 which is attached to the shaft of an electric motor 71. Light emitted by a constant intensity light source 58 and passing through objective lens 60 impinges on the upper portion of prism 62. This prism is of the type which internally reflects the incident light beam twice, the emergent beam traveling parallel with the incident beam. By this method the light beam 64 is effectively positioned so that it illuminates the inner side of the film record 52 at the position of the stationary narrow slit 66. In this way the amount of light which passes through the slit 66 at any instant is proportional to the transparent area of the strip film 52. As the film rotates at a constant speed in the direction of the arrow 53, changes in the amount of light which emerges from the slit 66 are proportional to the changes in height of the opaque portion relative to the transparent portion of the strip log 52. The emergent light beam is transmitted through collimator lens 68 and onto a photoelectric cell 70.

More particularly, the objective lens 60 is adjusted to throw an image of the lamp filament on the optical slit 66. The collimator lens 68 is so designed that it images the objective lens on the sensitive surface of the photocell 70. With this optical arrangement the incident light on the photocell is a disc which varies in intensity in accordance with the height of the opaque portion of the film, but the spot does not change in size or position. Thus a slit of light of variable length is transformed into a disc of light of variable intensity. This feature is important for accurate work since the surface of the photocell cathode is, in general, not of uniform sensitivity throughout its area.

In practice the motor 71 rotates the peripherally disposed film strip graph 52 at a constant speed, the speed being adjusted so that its rate of passage by the slit 66 is in direct accordance with the time coordinate along the length of the film 52. In order to adjust the speed, the calibrating steps 54 may be used for accurate time marks. The width of the optical slit 66 is such that only a small time segment of the film 52 is observed at any one instant. In practice, the width may be such that a time interval of about one millisecond is seen at any instant through the slit at the normal speed of rotation of the wheel 56.

In a manner well known to the art, the photoelectric current from the photocell 70 is applied to a preamplifier 72 which serves to drive selected output loads without undesirable interaction with the photocell 70. A power supply 74 is arranged to supply energy to the lamp 58, the preamplifier, and to energize the motor 71.

Thus, the photoelectric scanning device 50 functions as a whole to produce an output signal on line 73 which instantaneously changes as a function of time in proportion to the changes in the height of the opaque or transparent portion of the film 52. More particularly, since the peripheral velocity of the film 52 is carefully controlled, the time coordinate originally plotted along the length of the film is accurately preserved in the reproduced output from the preamplifier 72.

The electrical output signal from the photoelectric scanner 50 is applied by means of line 73 to the input of a "seismic pulse" network 75. As previously explained, this network is characterized by the fact that it produces an output signal having the shape of the shot or seismic pulse $P_i(t)$ when it is excited by a step function at its input. As more fully described hereinafter, the network 75 commonly assumes the form of a band pass filter, the shape of the band pass characteristic being adjusted to produce the conditions just described. In practice it has been found effective to use for this purpose a commercially available continuously adjustable electronic filter such as the type made by the Spencer Kennedy Laboratories. This particular type of filter is characterized by a high input impedance and a low output impedance and hence it does not load the preamplifier 72. Moreover, the low output impedance of the seismic pulse net work 75 allows it to be connected directly to the electrical equivalent of a seismometer 78, the latter being designed to be driven by a low impedance source.

In accordance with the characteristics heretofore described, the signal appearing in the output of the seismic pulse network 75, as the film 52 is scanned represents the ground motion predicted at the surface on the basis of the variations in the value of the acoustic impedance Z with depth of the subsurface formation in accordance with the notation used heretofore, the output signal obtained from the seismic pulse network 75 is designated $P_r(t)$. The voltage at the output of the pulse network varies as a function of time in the same manner that the velocity of the earth's surface at the top of the well would vary if a seismic pulse $P_i(t)$ were generated at the top of the well and only the pulse were to be reflected at each depth in the well in proportion to the derivative of the logarithm of the acoustic impedance at that depth with respect to travel-time at that depth.

In describing the synthesizing system shown in FIG. 8, it has been stated that the film strip graph 52 exhibits variations transverse the length which are proportional to the logarithm of the acoustic impedance Z. In this way, both of the variables, e.i., velocity and density, which can produce reflections are taken into account. However, it has been discovered that when the film strip log 52 exhibits variations proportional to the logarithm of the interval velocity alone, very useful results are obtained hereby. This is equivalent to assuming that the density of the formations is constant with depth or else that the density varies as any power of the velocity. Moreover, the assumption that the density is constant need not imply that it be constant for the entire depth of the well, but only that it is substantially constant over an interval of depth which is about equal to or greater than the wave length of the shot pulse propagated downwardly through the media. In practice this latter assumption is often a very close approximation to the true condition. For this reason, seismograms synthesized from interval velocity information alone are very useful.

It is desirable for purposes of monitoring the output of the photoelectric scanner 50 to record on the final synthetic seismogram a trace corresponding with the output of the scanner 50. In the system illustrated in FIG. 8, this is accomplished by means of a high frequency recording galvanometer $g_1$ connected directly to the output line 73 of the scanner 50, the galvanometer being one of a number of recording galvanometers in the multiple element oscillograph O. Recording equipment found particularly adaptable to the latter function is of the type generally employed in the seismic prospecting industry whereby a series of adjacent traces are produced on a strip of photographic paper, each trace corresponding with the undulations in the current supplied to a corresponding galvanometer. As shown here, the monitoring trace $T_1$ corresponds with the output from the photoelectric scanner 50.

It is also desirable to provide a record on the final seismogram of the synthesized ground motion $P_r(t)$ produced at the output of the seismic pulse network 75. For this purpose the output of the seismic pulse network 75 is fed to a second galvanometer $g_2$ which produces a trace $T_2$ adjacent the trace $T_1$. Undesirable interaction between the seismic pulse network 75 and the galvanometer $g_2$ connected to the output thereof is avoided due to the low output impedance of the network. Similarly the output impedance of preamplifier 72 is sufficiently low so that undesirable interaction between the galvanometer $g_1$ and the preamplifier is negligible. Hence, traces $T_1$ and $T_2$ accurately represent the two signals available at the input and output respectively of the seismic pulse network 75.

In normal reflection seismograph surveying the signal representing the ground motion is modified during the detection and recording process by the frequency response characteristics of the seismometer, the seismic amplifier and the recording galvanometer. Furthermore, as normally practiced, the seismic amplifier usually contains frequency selective filters which are adjustable to pass desired bands selected in accordance with the frequency distribution or spectrum of the useful seismic information. In this way the "signal-to-noise ratio" of the traces recorded on the final seismogram may be maintained at a maximum commensurate with the nature of the equipment being employed.

In the present invention it is also desirable, in order to better correlate the synthetic seismograms with field seismograms, to introduce certain frequency response characteristics into the system. In FIG. 8 these are illustrated by the equivalent seismometer 78, the seismograph amplifier 80 and the galvanometer $g_3$. The equivalent seismometer 78 is, in practice, an electrical network whose frequency response characteristics, as measured between the input and output terminals, represent substantially the frequency response characteristics of the actual seismometers employed in reflection work, the latter response being measured as a ratio of the electrical output voltage to the velocity of motion of the seismometer case when in place on the ground. Since most seismometers employed in this type of work are of the velocity responsive type, i.e., the output voltage is instantaneously proportional to the velocity of the seismometer case, the equivalent seismometer network 78 accurately simulates this characteristic. As previously described, the output signal $P_r(t)$ from the seismic pulse network 75 is, in effect, the synthesized instantaneous velocity of the surface of the ground. Hence, the output signal obtained from the equivalent seismometer 78 in response to the driving signal $P_r(t)$ is the same as would be produced by an actual seismometer executing instantaneous velocities of the form $P_r(t)$. In practice the output impedance of the equivalent seismometer 78 is identical with the output impedance of an actual seismometer. Thus the equivalent seismometer is connected directly to the input terminals of a standard seismograph amplifier 80 and all mutual interaction therebetween is preserved in the same form as would be the case if an actual seismometer were connected to the seismic amplifier.

The aforementioned adjustable filtering network 81 within the seismograph amplifier 80 is adjusted in accordance with the filter settings employed during the making of the original seismogram with which it is desired to correlate the synthetic seismogram. In this way the total overall frequency response of the two systems, i.e., the system actually used in the field and the system used in synthesizing are substantially identical. By employing this similar filtering action, the time delays of the seismic traces and their waveforms are preserved in such a way that direct correlation between the field and synthesized seismograms is possible.

In order to produce a synthesized seismogram which has the general appearance of the field seismogram, it has been found desirable to represent the output signal of the seismic amplifier 80 by recording more than one trace in parallel. In order to accomplish this end, a wide band cathode follower amplifier 82 is employed in the system of FIG. 8, the output of which drives a number of galvanometers $g_4, g_5 \ldots g_8$. The cathode follower amplifier 82 is connected to the output terminals of the seismic amplifier 80 and exhibits a high input impedance and low output impedance. A galvanometer $g_3$ is also connected across the seismic amplifier terminals in order to provide the proper load. The output impedance of the cathode follower is sufficiently low so that the galvanometers $g_4, g_5 \ldots g_8$ do not produce any substantial loading thereof. In this way the signals applied to the galvanometers $g_4 \ldots g_8$ are substantially identical with the signal applied to galvanometer $g_3$. Hence, the corresponding traces $T_4 \ldots T_8$ are substantially identical with trace $T_3$ and together they form a family of nested adjacent traces having the general appearance of a seismogram.

Figure 9:
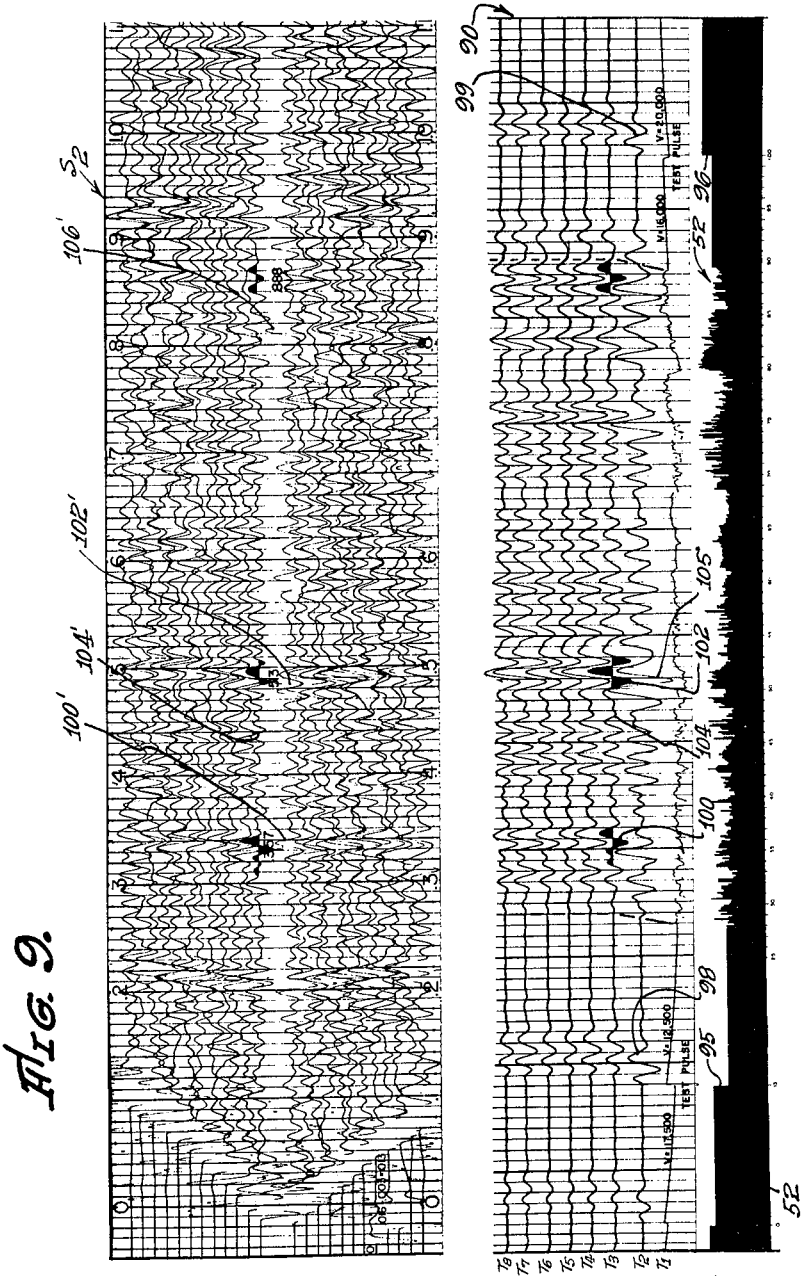
FIG. 9 illustrates a synthetic seismogram produced by the apparatus of FIG. 8, together with a well log from which it was produced and a field seismogram made in the area of the well.

An actual example of traces $T_4 \ldots T_8$ of a synthesized or predicted seismogram 90 produced by the above described method is shown in FIG. 9. Also shown is a photographic reproduction of the film strip graph 52 (inverted in phase) with the time scale. It will be understood that the exact shape of each of the "spikes" shown on the film strip log 52 is not important so long as the general frequency content existing in the band of interest is preserved. The galvanometer $g_1$ employed to produce trace $T_1$ representing the electrical output signal of the scanner 50 had a resonant frequency of 500 c.p.s. In this case, trace $T_1$ is seen to be slightly rounded as compared with the strip graph 52. This difference in character is due to the removal of some high frequency components which are actually outside of the useful seismic spectrum. Moreover, this effect is of little consequence since the frequency response of the overall system is further restricted by the filter network 81 employed in the seismograph amplifier 80. The rounding or smoothing of the trace $T_1$ occurs because of the cutoff characteristics of the galvanometer and the optical system. These two parts together constitute in effect a band pass filer. The cutoff frequency of the galvanometer and optical system together is above the upper cutoff frequency of the filter network 81.

In addition to the measured variations in interval velocity, the logarithm of which is exhibited in the strip graph 52, calibrating step functions 95 and 96 are also provided. For example, the step function 95 is produced by a sudden change in the velocity of propagation of the formation from a value of 17,500 f.p.s. (feet per second) to a value of 12,500 f.p.s. The actual height of the step 95 is proportional to the logarithm of the ratio of these values. Calibrating step function 96 is related to a change of velocity from 16,000 f.p.s. to 20,000 f.p.s.

As previously mentioned, the trace $T_2$ represents the synthesized instantaneous velocity of ground motion obtained from the output of the seismic pulse network 75. It should be observed that the input calibrating step function 95 causes the seismic pulse network 75 to emit its characteristic step function response 98. As previously described, the frequency response characteristics of the seismic pulse network 75 are adjusted so that the pulse 98 has a shape substantially the same as the shape of the pressure wave emitted by the dynamite blast and measured at depth in the borehole. Methods of determining the shape of this pulse will be more fully disclosed hereinafter. It should also be observed that a characteristic output pulse 99 is produced on trace $T_2$ by the calibrating step function 96. It is to be noted, however, that the amplitude is smaller and is, in fact, proportional to the amplitude of the instigating step function 96. In this way the amplitude of the synthesized ground motion produced by an accurately known contrast in velocity is obtained and is useful for calibration purpose. The calibrating step functions may also be used for checking the "phase" or "polarity" of the system in order to avoid the possibility of accidental phase reversal in the connections as compared with those occurring in the actual field seismograph.

Traces $T_3, T_4, \ldots T_8$ represent the output from the seismograph amplifier 80, the amplifier having exerted a frequency response limitation thereon in accordance with the setting of the filter network 81 therein. Many distinct reflections, such as reflections 100 and 102, occur on the traces $T_3 \ldots T_8$ of the synthetic seismogram.

The vertical timing lines which occur at intervals of 0.01 second are produced by the oscillograph O during the making of the reflection seismogram 90 and are controlled by an accurately regulated source. In the manner usual to the reflection seismograph art, these lines are employed to accurately time the instant of occurrence of desired reflections such as reflections 100 and 102.

In order to more fully illustrate the efficacy of the present invention, part of an actual reflection seismogram $S_2$ obtained in the field is also shown in FIG. 9. This seismogram was recorded in the vicinity of the well borehole in which the interval-velocity data represented by the strip graph 52 were obtained. The seismogram $S_2$ has been displaced relative to the prediction seismogram 90 by an amount sufficient to account for differential time delays such as are caused by the time delay in the weathered layer and also to adjust for differences in datum planes used. The reflections 100 and 102 picked on the synthesized seismogram 90 are seen to correlate both in waveform and in time of occurrence with the actual reflections 100' and 102' occurring on the actual field seismogram $S_2$. In addition it can be seen that other reflections which are not clearly evident by themselves on the actual seismogram $S_2$ may be identified by correlation with the events on the predicted seismogram 90. A particular example is illustrated by reflection 104 of the synthesized record 90 and its correlation reflection 104' shown on the field seismogram $S_2$. In most cases the rather weak reflection 104' would probably not be picked in regular seismograph operations. However, by means of the synthesized seismogram 90 it is seen that the reflection 104' is in fact a useful indication of subsurface variations in velocity and hence, although weak, should probably be picked as an indication of the true subterranean conditions. Other similar examples may be observed by inspection and comparison of the two records.

On the other hand, it appears that for this particular case certain reflection-like disturbances on the actual seismogram $S_2$ are unrelated to the synthesized reflections on seismogram 90. An example of this characteristic is illustrated by the "reflection" 106' of the field record $S_2$ and the lack of correspondence with the traces on the predicted seismogram 90. Situations of this character would indicate that some spurious undesired condition is producing the undulations 106' and that they are not in fact produced by variations in the value of subterranean velocity of propagation, but are due to some other cause. However, it will be recalled that the process of producing synthetic seismograms disclosed does not account for multiple reflections. Hence, events of the type 106' which appear on the field seismogram but have no counterpart on the corresponding synthetic seismogram may be due to unwanted multiple reflections. It is also possible, of course, that subsurface variations in density without corresponding changes in velocity could occur and would produce such a condition. However, it is believed that such conditions are rare and that "reflection" 106' should not be picked.

*The seismic pulse network*

As previously indicated, the seismic pulse network 75 produces an electrical wave having the same form as the initial downwardly traveling seismic pulse propagated into the earth by the explosion of a charge of dynamite in a shothole. There are several methods available for determining the characteristics which the network should have in order to produce this result.

In the best mode of practicing the invention now known, the actual shape of the initial seismic pulse is determined by a direct measurement with a seismic wave detector held at a substantial depth in the well borehole during the making of the field seismogram at the well location.

The seismic wave detector suspended within the borehole is preferably of the pressure-sensitive, hydrophone type as disclosed and claimed in Patent No. 2,947,337 because experience has indicated that the use of this type of detector in well-shooting is capable of producing an electrical waveform which corresponds very closely to the waveform of the seismic waves received by the detector.

As explained in co-pending patent application Serial No. 366,172, filed July 6, 1953 and entitled Seismic Prospecting System, now Patent No. 2,740,945 the pressure $p$ at a point in an elastic medium is related to the particle velocity $v$ at that point by a linear equation $p=kv$. Thus, by employing a pressure sensitive hydrophone to detect the shape of the initial seismic pulse, the electrical waves generated thereby are in reality a measure of the instantaneous particle velocity of the fluid surrounding the hydrophone. Moreover, the fluid in the borehole is caused to execute undulatory motions in correspondence with the motion of the side walls and hence the particle velocities of the fluid in the hole and of the walls are approximately the same. Therefore, at any particular point in the well the electrical output of the hydrophone is a close measure of the instantaneous particle velocity of the medium surrounding the borehole at the depth of the hydrophone. It is understood that the frequency response of the entire system employed in making such a waveform measurement should, for this purpose, have upper and lower limits which are far enough apart to pass substantially all important components of the seismic waves received at the detector, such as components lying between about 5 c.p.s. and about 200 c.p.s. In this way, the recorded waveform closely represents the form of the seismic wave pulse received by the seismic wave detector situated in the borehole. Moreover, as explained in said Patent No. 2,947,337, the use of a hydrophone type of detector in place of a seismometer produces other advantages as well. Thus when employing a hydrophone in this manner the waveforms produced thereby in response to the receipt of a seismic wave caused by the explosion of a charge of dynamite at a point beneath the weathered layer may be directly compared with instantaneous particle velocity measurements in the medium.

In the most effective way for ascertaining the form of the primary seismic wave pulse a recording is made at a hydrophone located in a well borehole simultaneously with the recording of reflected seismic waves at a spread of geophones located at the top of the borehole. Such a system is illustrated in FIG. 10. There, it will be noted that a split spread 100 of geophones 101 is arranged at the surface with the center of the spread located adjacent the top of the borehole 102a. A source 103 of seismic waves in the form of a charge of explosive is located at the bottom of a shothole 104a drilled into the earth adjacent the top of the borehole to a point beneath the bottom of the weathered layer 105a. A blaster B is employed to detonate the charge of explosive in order to generate a primary seismic wave pulse. A hydrophone 106 is supported in the borehole 102a by a cable 107, and the hydrophone 106 is located at a substantial distance beneath the source 103. For best results, the spacing of the hydrophone beneath the seismic wave source 103 should be greater than about several times the dominant wave length of the pulses which are to be detected. A suitable distance is generally several hundred feet.

The blaster B and the hydrophone 106 are connected respectively to galvanometers $G_{103}$, and $G_{106}$ and the geophones 101 are connected to corresponding galvanometers $G_{101}$ in a seismograph recording system 110 adapted to produce a multiple trace record 112 of the relative times of occurrence of signals at the galvanometers. With this arrangement, when the blaster B is operated, the charge of explosive 103 is detonated causing a primary seismic wave pulse to travel downwardly in the earth where it is reflected at various depths in amounts depending upon the rate of change of acoustic impedance at those depths. At the time that the charge is detonated, a signal from the blaster B produces a time break TB on the record. The reflected waves which are received by the geophones 101 are recorded as corresponding traces $T_{101}$ on a seismograph record 112, such a record being of the general character of a seismograph record of the type illustrated in FIG. 9.

When the primary seismic wave pulse which is traveling downwardly arrives at the depth of the hydrophone 106, a record is made of the changes of pressure occuring in the well fluid, thereby producing a record of the pulse $P_i(t)$ on the trace $T_{106}$. Information regarding the form of this pulse is then employed in the production of a synthetic seismogram that is to be correlated with the seismogram that is recorded simultaneously.

Having determined by this method the shape of the field seismic pulse, the frequency response characteristics of the seismic pulse network 75 are then adjusted so that it produces an output waveform in response to a step voltage input that closely approximates the seimic pulse wave shape. The frequency response adjustments of the network may include variations of both lower and upper cut-off frequencies and of the attenuation rates with frequency outside of the pass band.

If a velocity sensitive seismic wave detector such as a seismometer is employed in the seismic pulse measurements in the borehole, then the frequency response characteristics of the network 75 are adjusted in conformance with the waveform produced by the seismometer. In order to increase the utility of the results for this type of operation, it is effective to anchor the seismometer to the sidewalls of the borehole and leave the supporting cable slack during the measurement.

When the field seismic pulse wave shape is determined in either of the above ways, the resulting frequency response characteristic of the seismic pulse network 75 often assumes a form of the type shown in FIG. 11. Frequency response curve 150 corresponds with that employed during the synthesis of seismogram 90 of FIG. 9. For that particular case, waveform 98 was the result of closely approximating the waveform actually observed at depth in the well borehole. Frequently the waveform observed at depth in the borehole contains a wider frequency spectrum and is more properly approximated by a curve such as 152 of FIG. 11.

Also shown in FIG. 11 is a dotted curve 153 which represents the overall frequency response of the equivalent seismometer 78, the seismograph amplifier 80, including filter 81, the cathode follower amplifier 82 and a galvanometer $g_4$, as the system was adjusted during the making of the seismogram trace $T_4$ of FIG. 9. Such amplitude spectra completely specify the physical constants of such devices where, as here, they are minimum-phase devices.

In this particular case, the response curve of the seismic pulse network 75 is narrower than that of the remainder of the system. In other cases, the situation is reversed. For example, the system response curve 153a corresponds to a seismogram synthesized through the relatively broad seismic pulse network having the response indicated by the curve 152. In any event, the seismic amplifier filters are usually set the same as those employed in the actual seismograph amplifiers during the making of the field seismogram adjacent the borehole, and the synthetic seismogram is recorded at the same time rate as the field seismogram. In this way, correlation between the synthetic and field seismograms is more easily obtained. It should be noted, however, that a "higher fidelity" record is obtained from the trace $T_2$ recorded directly from the output of the seismic pulse network. However, the greatest overall utility is found to result from the deliberate filtering out of information with the seismograph amplifier filters, thus increasing the ease of correlating events on the field and synthetic seismograms.

As indicated above, the spectrum of a seismic wave pulse is characterized by a broad band of frequency components. This band is centered near a frequency having period approximately equal to the time interval between successive positive lobes of the pressure pulse represented in FIG. 23a. Furthermore, the dominant wavelength of the pulse in a medium characterized by a particular velocity is about equal to the spacing between successive positive compression zones of the downwardly traveling seismic wave pulse. By measuring well log data over depth intervals that are small compared with this dominant wavelength, it becomes possible to ascertain by synthesis the effects of rapid changes of formation characteristics on a reflection seismogram. However, by filtering the signals generated in accordance with such formation characteristics, it becomes possible to produce a synthetic seismogram having about the same definition as a field seismogram. In this way a record is produced which is free of minor fluctuations which might otherwise obscure, if not completely conceal, wave components corresponding to those present in a field seismogram. Thus the integrated effects of rapid changes in formation characteristics are made available in a synthetic seismogram for correlation purposes by reducing the definition of the log data in the synthesis process.

To illustrate the general effect of varying the lower and upper cut-off frequencies associated with the seismic pulse network frequency response curve, the transients in FIG. 12a are shown. For purposes of uniformity the upper and lower cut-off frequencies are considered to be the frequencies for which the curves of the same type 150 and 152 of FIG. 11 exhibit a value 3 db below the midband or peak level. Thus curve 152 has lower and upper cut-off frequencies of 20 and 60 c.p.s. respectively. The maximum rates of attenuation with frequency on the "skirts" of the curves are 18 db/octave.

In reference to FIG 12a it will be observed that with a fixed lower cut-off frequency of 20 c.p.s. the step function response of the seismic pulse network exhibits substantial variation with changes in the upper cut-off frequency. More particularly, when the upper cut-off frequency is set at 40 c.p.s., the second positive lobe 154 of the step function response 156 is larger than the first positive lobe 158. The reverse is seen to be the case when the upper cut-off frequency is increased to 60 c.p.s. for which case the waveform 166 is obtained. In this case, the second positive lobe 164 is smaller in amplitude than the first positive lobe 168. Moreover, the times of occurrence of the lobes relative to the time of application of the input step wave are seen to vary with changes in the upper cut-off frequency of the network. This phenomenon corresponds with the general change in the peak of the frequency spectrum of energy associated with the waveforms produced by the seismic pulse network 75.

Two additional step function responses are illustrated in FIG. 12a corresponding respectively to lower and upper cut-off frequencies of 40–60 c.p.s. and 30–80 c.p.s. In general it should be observed that a variety of types of waveforms may be obtained with the simple adjustable filter whose generalized frequency response curves are illustrated in FIG. 11. It should be understood of course that this filter was chosen due to its ready availability and simplicity. However, for special purposes it is possible to obtain a very wide variety of step function response waveforms by varying not only the lower and upper cut-off frequencies of the seismic pulse network, but also by varying the rate at which the low frequency and high frequency components are attenuated. For the examples illustrated in FIGS. 11 and 12a the attenuation rates are 18 db per octave. However, other suitable values such as any multiple of 6 db per octave may be readily provided for the purpose of more clearly approximating waveforms of seismic waves received in the borehole.

It frequently occurs that borehole measurements of the waveform of the field seismic pulse producing the actual field seismogram are not available. In such cases, measurements made in a similar way during a well velocity survey made at a different time and in the same area may be used. As previously indicated, a well velocity survey is made by measuring the time required for the seismic wave emitted by a charge of dynamite at or adjacent the surface of the well to travel to a seismic wave detector suspended within the borehole. In practice, a series of charges of dynamite is detonated at different times, each corresponding to a different depth at which the detector is located in the borehole. In accordance with the present invention, however, not only is the time necessary for the travel of the seismic waves determined, but also the form of the wave received at the detector. In this process, again the characteristics of the seismic pulse network are adjusted so that when a step voltage is applied it produces a waveform which closely approximates that measured at depth in the borehole.

In some cases, not even well velocity waveform data are available. In this event still other methods are available for adjusting the characteristics of the seismic pulse network. Thus in an article by Norman Ricker entitled "The Form and Laws of Propagation of Seismic Wavelets," published in vol. XVIII, No. 1 January 1953 of Geophysics, certain theoretical developments are given. In that article Dr. Ricker develops the waveform to be expected in an infinite homogeneous isotropic medium exhibiting viscosity when an elastic wave is propagated therethrough by an impulsive shot pulse. It is shown that the form of the velocity wavelet to be expected at various distances from the shot varies in accordance with certain laws. Also given in Dr. Ricker's article are some examples of actual field measurements which closely verify the theoretical predictions.

In FIG. 12b there is shown a representation of the velocity of ground motion to be expected from Ricker's theoretical basis at a distance of at least several hundred feet from the shot point. Waveforms of the type shown at 200 in FIG. 12b are often observed in practice. Theoretically the symmetrical waveform 210 should be expected at a very great distance from the shot point. In accordance with the present invention the characteristics of the seismic pulse network 75 may, in the absence of measured wave shapes from a well velocity survey or other such source, be adjusted in accordance with generalized waveforms of the type developed by Ricker. For example, a theoretical Ricker wavelet having the waveform 200 may be employed instead of an actual seismic pulse detected in a well. Reference to FIG. 12a shows that step function response 176 is quite similar in shape to waveform 200. Furthermore, theoretical wavelet 210 is quite closely represented by step function response 156. Other more complicated networks than the simple one characterized by response curves of the type shown in FIG. 11 may be employed if it is designed to approximate the waveforms 200 and 210 of FIG. 12b more closely. However, in practice it is found that even though the wavelet forms observed in the well borehole are not reproduced with great accuracy at the output of the seismic pulse network some of the advantages of the invention are nevertheless realized.

When a particular synthetic seismic wave pulse has been found which produces readily recognizable reflections at particular parts of a synthetic seismogram, it is then often possible to design a shooting technique for use in the same area in order to produce field seismograms in which reflections from those strata may also be readily recognized. For example, if as a result of employing a seismic pulse network characteristic having a peak frequency of 80 c.p.s., it is found that readily recognizable reflections are produced in parts of a synthetic seismogram corresponding to a particular depth, the size and arrangement and timing of the shots of a plurality of explosives may be adjusted so as to cause energy of the downwardly traveling seismic pulse to be concentrated at that frequency. Such a concentration of the seismic pulse energy in a particular frequency region may be accomplished for example by employing a vertical spread of explosive charges beneath the surface of the earth and spacing the charges from each other at intervals which equal the wavelength at that frequency. In this connection, it is to be noted that the wavelength in question depends upon the velocity of the medium in which the charges are placed rather than upon the velocity of the medium from which the reflections are to be detected.

Moreover, it is often useful to make a series of records employing various seismic pulse network characteristics, in order to discover particular portions of the frequency spectrum which are better suited for synthesizing reflections from a well log than are synthesized by employing the spectrum of the seismic pulse actually observed in the well borehole. In effect, such a procedure simulates varying of the shape of the actual dynamite-induced seismic pulse for best results.

A final method for effecting the adjustment of the seismic pulse network characteristics involves the direct adjustment of the network to empirically arrive at the "best fit" between the reflections appearing on the field seismogram and those appearing on the synthetic seismograms. In this method, the filters 81 in the amplifier 80 are set the same as the settings employed for the field seismograms. Then a synthetic seismogram 90 is produced for an arbitrary setting of the parameters of the seismic pulse network 75. After comparing the synthetic with the real seismogram, a new adjustment is chosen for the network 75 and a second record is produced. This "cut and try" process is continued until the "best fit" is obtained.

When adjusted in this manner, the network is in effect simulating not only the general pulse shaping effect of the earth, but is also simulating certain other real characteristics such as the "filtering effect" of the weathered layer and any effects produced by an extraordinary velocity contrast at the base of the weathered layer. Use of this method results in the best correlation between the real and synthetic seismograms. On the other hand, the results are also of lower "fidelity" than those obtained from the process of directly approximating waveform seismic pulses detected in a borehole. It should be recognized that when borehole measurements are employed, the weathered layer does not enter the synthetic seismogram picture since both shot and detector are below the weathered layer. It is for this reason that better correlation of field and synthetic seismograms may occur when the network is adjusted to produce a waveshape from that observed on a record made in a well borehole.

*Pulse shape and time delay adjustments*

It has been indicated above that borehole measurements of the downwardly traveling initial seismic pulse are not always available. It was further indicated that in these cases, and where otherwise desirable, a "cut and try" process may be followed in the adjustment of the characteristics of the seismic pulse network. In this method of practicing the invention, the actual field seismogram is approximated as nearly as possible by empirical adjustments of the seismic pulse network characteristics in order to produce the best overall "fit" between the synthetic and real seismograms. In accomplishing this end, it is sometimes found that the waveform or reflection shape on the synthetic record may be made to closely approximate that of the field seismogram, but at the same time occurs at the wrong time on the record. In these cases it is advantageous to adjust the rate of attenuation of the "skirt" of the frequency response curve of the seismic pulse network without appreciably varying the cut-off frequencies at the same time.

Thus, for example, it may be found that the proper reflection waveform is obtained with attenuation slopes of 18 db per octave on the lower and upper ends of the frequency response curve, but that the time delay suffered by the reflection transient in passing through the network is not sufficient to cause it to "line up" with the corresponding reflection found on the field seismogram. In order to increase the time delay in this case, the rate of attenuation of, for example, the low frequency slope is increased to, say, 36 db per octave. A general increase in the time delay of the reflection waveforms passing through the network results from this adjustment due to the increase in the slope of the phase shift curve associated with the network. At the same time, however, it is often observed that no substantial change in the reflection waveform occurs. In other cases it has been found that the wave shape of the reflection events may be affected appreciably by adjustment of the attenuation slopes of the low and high frequency cut-off ends of the frequency response curve of the seismic pulse network.

In effect the problem of adjusting the characteristics of the seismic pulse network for any particular case may differ from that of another case due to the interaction between the frequency spectrum of the strip graph and the frequency response characteristic of the network. In some cases minimum phase shift networks may be employed to establish the proper time coincidence. However, in other cases when non-minimum phase networks are employed to synthesize seismograms, they compare more favorably with the field seismograms. It will be understood that by means of non-minimum phase fillters, such as lattice networks, the phase shift characteristics of the system may be varied without at the same time using corresponding variations in the attenuation characteristics in the system.

In such a case, the seismic pulse network 75 comprises three independently adjustable sections 75', 75", and 75''' as indicated in FIG. 13. The first of these sections 75' constitutes a variable or adjustable filter. The second section 75" comprises a variable phase shift network. The third section 75''' comprises a variable time-delay network.

The variable filter 75' may be of a type in which the cut-off frequencies may be varied and in which the attenuation rates in both the high- and low-frequency regions are adjustable. Such a variable filter may be of the type manufactured by Spencer Kennedy Laboratories, Inc., of Cambridge, Massachusetts, under the designation "Variable Electronic Filter, Model 302." Such a filter may also be of the type manufactured by Krohn-Hite Instrument Company, Cambridge, Massachusetts, and sold under the designation "Band-Pass Filter Model 330A-Modifier." These filters have cascaded sections having continuously variable cut-off frequencies and have minimum phase characteristics. The variable phase shift network 75" may consist of a series of lattice networks or their equivalent in which the phase shift may be varied without altering the relative attenuation at different frequencies in the pass band of the variable filter 75'. The time-delay network may be of any conventional type in which signals appear at the output at a later time than they are impressed upon the input without, however, being subjected to a change in wave shape in transmission through the filter.

When adjusting the characteristics of the seismic pulse network 75 in order to best fit the real seismogram, it is desirable first to adjust the attenuation characteristics of the filter 75' in order to produce a proper relative balance between the low, medium, and high frequency components of the resulting seismogram as compared with the respective components of the field seismogram. This operation produces a match between the general "frequency character" of the two records. Such a match may be obtained by measuring the frequency-amplitude characteristic of the variable filter at various settings and choosing a setting in which the frequency-amplitude characteristic of the filter closely matches the frequency-amplitude spectrum of a measured seismic pulse. If this method of matching is employed, it may be accomplished without the necessity of taking into account the fact that adjustment of the filter 75' affects the phase shift of the seismic pulse network 75. In such a case, the next step is to adjust the phase shift network 75" to suitably shape the synthetic reflection waveforms to best fit the shape of the reflections observed on the field seismogram. In order to make it possible to match synthetic reflections with field reflections, the constants of the phase shift network are so selected that the curved portions of the frequency-phase characteristic of the network may be shifted back and forth within the pass-band of the variable filter 75'. The adjustment of the phase shift network 75" thus causes an alteration in the shape of a synthetic reflection even though no change occurs in the frequency-amplitude spectrum. In effect, the adjustment of the variable filter 75' and the variable phase shift network 75" produces a pulse network in which the shape of the pulse appearing at the output when a step function is applied to the input represents the effective seismic pulse $P_1(t)$ that produces the corresponding reflection on the field seismogram It is interesting to note that once a close correlation has been obtained between the waveform of reflections on a synthetic seismogram and the waveform of reflections on a field seismogram by adjustment of the variable filter 75' and the variable phase shift network 75", a step pulse may be applied to the input of the seismic pulse network 75 and the output may be recorded to determine the shape of the seismic pulse causing the reflections on the record. Thus, in this case, the reflection seismogram itself may not only be synthesized, but the seismic pulse may, in effect, be synthesized or, more strictly speaking, recreated empirically without the necessity of making records of seismic waves in a well borehole. By so determining the shapes of seismic pulses responsible for causing reflections from the strata at various depths, the effect of the earth formations in altering the shape of the seismic pulse as the seismic pulse travels through the earth may be ascertained.

In any event, once the variable filter 75' and the variable phase shift network 75" have been adjusted to produce a close match of the waveforms of a synthetic reflection and a field reflection, then the time delay network 75''' is adjusted to cause the synthetic reflections to be recorded on the synthetic seismograms at times corresponding to the actual travel-times at which the reflections occur on the field seismograms.

The time delay network 75''' may be in the form of a reiterative low-pass filter. Such a filter may be produced by employing low-pass filter sections in which the cut-off frequencies are high compared to the cut-off frequency of the variable filter 75' and in which the damping coefficient is about 0.7 of critical. In this way, the phase shift occurring in the time delay network 75''' is a linear function of frequency and is zero at zero frequency. By adjusting the constants of such a network, the slope of this linear curve and thence the time delay produced by the network may be varied.

In practice, the variable filter 75', the variable phase shift network 75", and the time delay network 75''' are adjusted to bring about a close correlation between a synthetic seismogram obtained from a log of a well and a field seismogram produced by a reflection seismograph positioned to receive reflections from strata very close to the well. For example, if the subsurface strata have low dips, the field seismogram employed for this purpose may be obtained by recording reflections by means of a split-spread centered adjacent the top of the well. In case the subsurface strata have higher dips, appropriate time corrections may be applied, corresponding to the seismic wave travel paths. Time corrections are also applied for delays in the weathered layer. If the borehole is not vertical, appropriate corrections are also made to the travel-time well log.

It will be noted that if the multiple head system of

FIG. 22 is employed, the adding network 575 may include a variable shift network 75″ but that no time delay network 75‴ need be employed, since the reproducing heads may effect a time delay merely by displacing them as a group along the axis of the record 501.

From an examination of FIGS. 12a and 12b, it will be observed that the lobes of the pulse occur a substantial time after the inception of the pulse. For this reason, to assist in a visual comparison of a well log and either a synthetic seismogram or a field seismogram, the seismogram is advanced along the length of the well log by a time distance corresponding to the time elapsed between the inception of the pulse and the occurrence of one of the lobes. Usually the time selected corresponds approximately to the occurrence of the largest lobe. For brevity this time interval is referred to as the lobe or pulse delay.

*Amplifier characteristics*

Implicit in the mathematical analysis set forth above and the description of the apparatus of FIG. 8 is the assumption that the primary seismic wave pulse is not attenuated during its downward travel in the earth. This assumption disregards loss of intensity due to the diverging character of the wave, loss of energy due to reflection, and attenuation caused by viscous and thermal losses.

It will be understood that although the general reduction in seismic wave amplitude with depth has been disregarded, nevertheless the general effect of such a loss of energy in actual field seismology is normally counteracted by employing seismic amplifiers having automatic volume control systems. With such systems secular or long range attenuation effects are largely neutralized. Hence in the practice of the invention the problem of loss of energy in the field is of little importance. For this reason, in practicing the invention synthetic seismograms may be produced from well log information by means of a constant gain amplifier 80. However, where it is desired to produce the best correlation of a synthetic seismogram with field seismograms which have been made with amplifiers employing AVC, the amplifier 80 of the seismogram synthesizer should also employ AVC.

In any event, in order to make use of a field amplifier in the synthesizer, the log is moved past the slit at the same time rate as that at which the field seismogram was recorded. In other words, the successive parts of the log 52 appear opposite the slit 66 at the same relative times that would be required for a downwardly travelling seismic wave to reach the corresponding formations and return to the surface. By scanning the log at the same time rate as that existing in the recording of the field seismogram, the same filters can be used in making the synthetic seismogram as those used in making the field seismogram.

In this way the same phase distortion is produced by the amplifier in making the two seismograms.

*Logarithmic response*

In the systems described above employing a narrow slit, it has been assumed that to make a synthetic seismogram, records are available in which the logarithm of a formation characteristic is plotted as a function of travel-time. In some cases, the records may be in the form of logs of the characteristic as a function of travel-time. For example, the record may be in the form of a log of interval velocity rather than in the form of a log of the logarithm of interval velocity. In this case, the function of taking the logarithm may be accomplished automatically by means of a logarithmic scanning slit. Two such slits are illustrated in FIGS. 8a and 8b. These slits are employed in place of the slit 66 of FIG. 8. The slit 66′ illustrated in FIG. 8a is of the variable-density type and is employed in the scanning of a record 52 of the variable-area type. The slit 66″ of FIG. 8b is of the variable-area type and is employed in the scanning of a record 52 of either the variable-area or the variable-density type.

The slit 66′ shown in FIG. 8a has the same dimensions as the slit 66 previously described in the system of FIG. 8. This slit is composed of two opaque areas arranged on opposite sides of a variable-density area. The density in the aperture formed between the two opaque areas varies from one end of the aperture to the other as an inverse function of the distance from the edge, being opaque at one edge thereof. When a film strip graph 52 having a linear variation of interval velocity or acoustic impedance plotted thereon passes the variable density slit 66′, the amount of light transmitted through the slit is proportional to the logarithm of the interval velocity or acoustic impedance, as the case may be.

In the logarithmic slit 66″ illustrated in FIG. 8b, the width of the slit varies as an inverse function of distance from the edge, being very wide at one edge thereof and being very narrow at the other edge thereof. Such a slit may be designed for use with either a variable-area or variable density record 52. In either case, the shape of the slit is so designed that the total amount of light transmitted therethrough varies in proportion to the logarithm of the recorded function that is being scanned.

In still another way of employing linear logs, the simple slit 66 may be employed and the preamplifier 72 or an additional amplifier connected at its output may be designed to produce a voltage at its output proportional to the logarithm of a change in voltage impressed on its input above a predetermined level. Since logarithmic amplifiers are well known, they are not described here in detail.

It is thus seen that even when only linear well logs are available, the effect of logarithmic well logs may be obtained by the use of logarithmic slits or a logarithmic amplifier.

*Automatic strip log production*

In the systems described above, the film strip graphs have been produced by a step-by-step process. However, the film strip graphs may also be produced automatically. A system which is particularly adapted to produce a log of interval velocity as a function of wave travel-time is illustrated schematically in FIG. 14. In the logging system illustrated here, a voltage V is produced continuously which varies in direct proportion to the interval-time required for the seismic waves to travel from the source S to a receiver R in the interval-velocity well logging probe unit 700. In practice, a capacitor (not shown) is charged to a potential which is proportional to the interval-time, and the charge is maintained until the next measurement is made, at which time a new charge is transferred to the capacitor. Such a system has been disclosed in Geophysics, vol. XVII, No. 3, pp. 598–614.

Schematically shown in FIG. 14 is a cable C suspending an interval-velocity logging probe unit 700 in a well. The motion of the cable C during the well logging run is continuously metered by the measuring wheel W which is directly or electrically connected to cause proportional rotation of the disc 701 of an integrator 708. The cable C passes over a sheave 703 and is stored on a reel 705. The various electrical conductors of the cable C are connected to slip rings 704, the brushes of which connect with the logger surface equipment 706.

The output voltage V from the logger surface equipment 706 is a substantially continuous function of the depth x of the logging unit. A follow-up servomechanism 710 operates motor 715 to move rack 717 in such a manner that the displacement of the wheel 719 from the central axis of the integrating disc 701 is linearly proportional to the travel-time voltage V. Thus, in accordance with the well known properties of the wheel and disc integrator 708, the number of rotations of the output shaft 720 is proportional to the integral of the potential V with respect to $x$ between suitable depth limits $x_0$ and $x$. The output shaft 720 is connected through a reduction gear or other speed reducer (not shown) with a capstan 722 which provides a pulling action on the film 724 as it passes the variable-area recorder head 732 and is stored on the take-up reel 726 shown in the lower portion of the diagram. As a result, as the logger is moved in the well from a depth $x_0$ to a depth $x$ the film 724 is moved by the capstan 722 a distance proportional to the total travel-time, that is, the time that would be required for a seismic wave to travel from depth $x_0$ to depth $x$. Thus the number of revolutions made by the shaft as the probe unit moves from a depth $x_0$ to a depth $x$ is given by the equation $$N = K \int_{x_0}^{x} [\Delta t(x)] dx \qquad (20)$$

where K is a constant.

The interval-time function V is also applied to a logarithmic amplifier or attenuator 730, the output of which is applied to a variable area recorder head 732. The first unit functions to take the logarithm of the voltage function V and to supply the transformed function to the variable area recorder head 732. The latter unit serves to photographically record on the film 724, as a function of its displacement, a variable area signal which is proportional to the logarithm of the interval-time function V.

In operation, the interval-velocity probe unit 700 suspended by cable C in the well is in continuous motion. Measurements of the interval-velocity characteristics of the surrounding formation are made repeatedly at close intervals, and the information is transmitted through the cable C to the logger surface equipment 706. This equipment serves to continuously generate the potential V which is linearly proportional to the interval-time $\Delta t$, which in turn is a substantially continuous function of the depth $x$. The output function V acting through the integrator 708 moves the film past the recording head 732 in a manner such that distances along its length are proportional to total travel-time. Simultaneously, the interval-time function V is operated upon by the logarithmic amplifier or attenuator 730 and applied directly to the variable area recorder head. The result of this dual operation is to produce a film which, after development, has the general appearance of the strip graph 52 previously described. Distances along the length of the film are proportional to the total one way seismic wave travel-time, while distances measured transversely of the length of the film are proportional to the logarithm of the interval-time $\Delta t$ or to the logarithm of the interval velocity depending upon the manner in which the recorder head 732 is polarized.

It will be understood, of course, that the interval-time probe 700 may be of a type such as that described in Patent No. 3,170,136, in which two receivers are moved together with a seismic wave source in the borehole, and the voltage V generated at the surface is proportional to the time elapsed between the reception of the seismic wave at the two receivers.

It will be noted that if the amplifier 730 is linear rather than logarithmic, the film record 724 produced will represent a log of the interval velocity as a function of travel-time rather than a log of the logarithm of the interval velocity. It is to be noted further than the film drive system may also be employed to record logs of other characteristics of formations intersecting a well borehole when a probe adapted to detect and measure such characteristics is moved in the well borehole together with interval-time probe 700 or with interval-time information supplied from other means.

*Effect of density variation*

It has been previously indicated that seismic reflections arise from variations in both density and velocity of subsurface strata. However, in many cases information pertaining to the variation in formation density with depth is not available, and hence the synthesis procedure is carried out on the basis of formation velocity data alone.

It might appear that this process is equivalent to one of assuming the density constant with depth in the borehole. However, the real assumption being employed is considerably less severe. In effect, when employing velocity data alone, the formation density is considered to be essentially constant only over intervals in the borehole which are about equal to the longest wavelength component present in the recorded seismic pulse.

Furthermore, in cases where the value of the density is found to vary as some power $n$ of the velocity $c$, i.e., $$\rho = kc^n \qquad (21)$$

then an even more general result obtains. It will be recalled that an important step in practicing the invention is the making of a strip graph having thereon the logarithm of the acoustic impedance plotted versus the total seismic wave travel-time. In the present case the step of taking the logarithm of the acoustic impedance Z produces the equation $$\ln Z = \ln kc^{(n+1)} = \ln K + (n+1)\ln c \qquad (22)$$

It is to be noted that the result of this operation is to introduce a constant $(n+1)$ as a multiplying factor associated with the term $\ln c$. But, except for the coefficient $(n+1)$, the latter term of Equation 19 is precisely the form of the strip graph plotted in accordance with the embodiment disclosed in FIG. 8. Hence, the aforedisclosed system will also operate effectively in cases for which the density varies as any power of the velocity $c$. Moreover, it is not even necessary that the power $n$ be constant with depth in the borehole. It is sufficient if it is nearly constant merely over depth intervals which approximate the longest wavelengths of the initial seismic pulse. This fact renders synthetic seismograms produced from interval-velocity data alone of greater reliability than would be the case if it were necessary that the density actually be constant with depth.

*Production of density logs*

During the drilling of many wells, cores are frequently taken at closely spaced intervals. When these cores are brought to the laboratory, various measurements are made thereon. For the purpose of this invention, the velocity of transmission of seismic waves through the cores may also be measured. Ordinarily such measurements are not as reliable as interval-velocity data obtained in a well. In spite of this fact, measurements made directly on cores may be the best available for obtaining velocity data, particularly where the well was drilled prior to the time this invention became available and the well has been cased.

Methods are also available for making measurements in a completed well which would indicate variations in density. Such methods include, for example, the steps of radiating neutrons or X-rays into the formations surrounding the well at various depths and measuring the intensity of neutrons or X-rays that are scattered back into the well from the formations. By logging the intensity of the returned radiation, whether it be in the form of neutrons or X-rays as a function of depth, a log is obtained which indicates how the density of the surrounding formations varies with depth. If desired, such a log can be converted into one in which the density is plotted against seismic wave travel-time. This may be done, for example, by plotting the density as abscissae against seismic wave travel-time as ordinates. The seismic wave travel-time used in making such a plot is the same as the seismic wave travel-time measured in a velocity survey as previously described herein.

Density logs so obtained may be employed together with interval-velocity logs to produce logs of acoustic impedance as more fully described below.

Production of acoustic impedance logs

Although reflection seismograms have been synthesized from interval-velocity data alone and the results obtained thereby are highly useful, nevertheless if density data are also available then synthetic seismograms of even greater reliability may be produced. In describing the invention in connection with FIG. 8, it was assumed that the strip graph 52 that was available consisted of a plot of the logarithm of the acoustic impedance as a function of seismic wave travel-time. Such a plot can readily be made by multiplying the density at each depth in a well by the interval velocity existing at that depth and then plotting the logarithm of that product as a function of seismic wave travel-time. In other methods of practicing the invention, separate logs of density and velocity may be employed. Two systems making use of such separate logs are illustrated in FIGS. 15 and 16.

In the system of FIG. 15, an interval-velocity log 251 is scanned by an interval-velocity scanner 255, and a density log 252 is scanned by a density scanner 256. The two logs 251 and 252 are of the variable area type illustrated in FIG. 8, and the two scanners 255 and 256 are of the same type as the scanner 50 of FIG. 8. As a result, a voltage appearing at the output of the velocity scanner 255 varies as a function of time in the same way that the interval velocity varies as a function of travel-time on the log 251. Likewise, a voltage appearing at the output of the density scanner 256 varies as a function of time in the same way that the density varies as a function of travel-time on the log 252. The voltages appearing at the output of the two scanners 255 and 256 are applied simultaneously to a multiplying circuit 270.

As a result, the multipying circuit 270 produces at its output a voltage which is instantaneously proportional to the acoustic impedance of the formation corresponding to the seismic wave travel-time of the parts of the logs 251 and 252 being scanned. Proper synchronization of the two logs 251 and 252 may be maintained by mounting the two logs on separate drums which are driven from a common constant speed motor 257. A multiple drum photoelectric scanning system suitable for use with the present invention is illustrated at pages 338 and 339 of the aforementioned articles by Washburn and Olesen published in "Geophysics," volume V, No. 4, October 1944. Multiplying circuits which are suitable for use in the system of FIG. 15 are discussed by Samuel Seely in his book "Electron Tube Circuits," first edition, section 8–4, published in 1950 by McGraw-Hill Book Company, Inc., New York.

The output line 271 of the multiplying circuit 270 then carries a signal which is proportional to the instantaneous product of the values of the formation interval velocity and the formation density produced by the generators 255 and 256 respectively. This composite signal is applied to the input of a logarithmic attenuator 280 which serves to produce an output waveform which is instantaneously proportional to the logarithm of the amplitude of the wave applied to its input terminals. Thus the output signal available on conductor 281 at the output of the logarithmic attenuator 280 corresponds with the signal available at conductor 73 of FIG. 8. This composite waveform is then applied to the input of the seismic pulse network 75 that produces an output $P_i(t)$ in response to a step function applied to its input. As a result, a voltage $P_r(t)$ appears at the output of the seismic pulse network that varies in the manner represented by Equation 19. The output $P_r(t)$ of the unit of FIG. 15 is applied to a system employing the equivalent seismometer 78, the seismograph amplifier including filters 80, the cathode follower 82 and oscillograph O as illustrated in FIG. 8 in order to produce the final synthetic seismogram.

Another system utilizing both interval-velocity data and density data is illustrated in FIG. 16. In this system the photoelectric scanners 355 and 356 respectively employ film strip graphs 351 and 352 in which the abscissae are proportional to the logarithm of the interval velocity and the logarithm of the density respectively, both plotted as a function of total travel-time. In this case too, the two film strips 351 and 352 are mounted on drums driven by a common motor 357. In this case the outputs of the two scanners 355 and 356 are applied to the inputs of an adding network 375 which functions to produce an output signal which is proportional to the instantaneous sum of the two input signals. The output on line 376 represents the sum of the instantaneous values of the logarithms of the interval velocity and density variations versus travel time. Since the logarithm of the product of two variables is equal to the sum of the logarithms of the individual factors, the output from the adding network 375 represents the logarithm of the instantaneous product of the interval velocity and density and hence the logarithm of the acoustic impedance Z. The signal present on line 376 is then applied to the input of a seismic pulse network 75. In accordance with the theory previously explained, the output $P_r(t)$ from the network 75 represents the instantaneous velocity of ground motion synthesized from the interval velocity and density data. This output signal is employed in the same way as that produced in the system of FIG. 8 to produce a synthetic seismogram.

Use of interval-time logs

In the systems described above, the logarithm of the interval velocity $c$ has been employed in the process of synthesizing reflection seismograms. It should be noted, however, that the velocity $c$ is calculated by dividing the distance $d$ over which the interval velocity measurement is made in the borehole by the measured seismic wave travel-time $\Delta t$. Therefore, $$\ln c = \ln \left(\frac{d}{\Delta t}\right) = \ln d - \ln (\Delta t) \qquad (23)$$

In this way it is seen that the value of the logarithm of the interval velocity $c$ is given by the sum of a constant term and the negative of the logarithm of the interval travel-time $\Delta t$. Since only the variations or changes in the logarithm of the interval velocity $c$ are of importance in the process of synthesizing seismograms, the constant term in $d$ may be ignored. Hence, for the purposes of the present invention, wherever the logarithm of the interval velocity $c$ is employed, it may be replaced by the negative logarithm of the interval time $\Delta t$ corresponding to that particular depth.

In practice, the system of FIG. 8 may be modified to include this feature by employing a film strip graph 52 which exhibits transverse variations which are proportional to the logarithm of the interval time $\Delta t$ plotted as a function of the total travel-time. In order to introduce the effect of the negative sign of Equation 23, the connection of line 73 at the output of the preamplifier 72 may be reversed. A coupling capacitor (not shown) may be employed in the line 73 to remove effects of the first term of Equation 23. Similarly in FIG. 16 the photoelectric scanner 355 may employ a film whose transverse coordinate is proportional to the logarithm of the interval time $\Delta t$.

In either event the film strip may be prepared by plotting, as a function of seismic wave travel-time, the actually measured values of the difference in time $\Delta t$ required for waves to travel from a source to each of a pair of receivers that are moved in unison therewith in a well, as described for example, in copending application Ser. No. 462,062. By blacking in one side, a log of interval time $\Delta t$ is obtained; by blacking in the other side a log of interval velocity is obtained.

Derivative record system

Instead of employing a log 52 of the type previously described herein, in which the logarithm of acoustic impedance is plotted as a function of travel-time, use may be made of a log in which the derivative of the logarithm acoustic impedance is plotted as a function of travel-ne. The making of such a record involves an extra ep and for this reason it involves an extra expense. owever, a system for making and using such a log is deribed here to illustrate how the principles of the invenon may be applied when some other derivative record available for use. Other derivative records that may employed in this invention include, for example, well g data respecting gradients of interval velocity, resistivi-, or magnetic field intensity.

A system for producing a derivative record is illustrated FIG. 17. In this figure, the record 52 represents a log the logarithm of the acoustic impedance of any of its mponents plotted as a function of travel-time. Radiion from the lamp 58 passes through a portion of this cord 52 as the record passes a slit 66 of a scanner 50 of e same type previously illustrated in FIG. 8.

The radiation transmitted through the slit 66 strikes photocell 70 in which a voltage is produced having an nplitude which varies in the same way that the logarithm the acoustic impedance represented on the record 52 ries. Similarly, the voltage generated by the photo-ll 70 is amplified by a preamplifier 72. The output of e preamplifier is transmitted through a differentiating twork 76, through a power amplifier 79 and thence to a lvanometer 81. The deflections of the galvanometer are recorded as an oscillograph trace on the derivative cord 52'. As this record is advanced past the recording ement of the galvanometer, one side of the trace so oduced is blacked in with the result that a variable ea record is produced which represents the function $' Z(t)$, that is, the derivative of the logarithm of the oustic impedance as a function of travel-time.

A method of scanning the derivative record 52' in der to produce a synthetic seismogram with apparatus the type illustrated in FIG. 8 is here illustrated schematically in FIG. 18. In that figure, light from the lamp is projected through the derivative record 52' as it is anned by the slit 66. The light transmitted through e slit 66 impinges upon the photocell 70, the output which is amplified in the preamplifier 72. In this case, ough, instead of applying the output of the preamplifier directly to the seismic pulse network 75 as in the sys-n illustrated in FIG. 8, the output of the preamplifier is transmitted through an integrator circuit 83 at the put of the seismic pulse network 75. In this case, the tegrator circuit 83 compensates for the effects of the differentiating network 76, thereby producing at the output the seismic pulse network a wave train $P_r(t)$ that represents the train of seismic waves returned to the surface the earth. The output of the seismic pulse network ay then be transmitted through the equivalent seismometer 78, the seismic amplifier 80, and a cathode follower amplifier 82 as in the system previously described order to produce a synthetic seismogram.

As indicated previously, if the narrow-slit scanning stem of FIG. 8 is to be employed, the making of a rivative record is unnecessary. However, this and other rivative records may also be employed in other methods scanning such as the running cross-correlation system scribed below.

Running cross correlation systems

In the systems described above, the scanning of the cord has been accomplished with the aid of a slit or urrow aperture and a seismic pulse network. It is also ossible to produce a synthetic seismogram by scanning record with a wide aperture which has such a character-ic that successive parts of the record are viewed simultaneously by light transmitted through the record and through the aperture in such a way that the effects of the seismic pulse network are obtained optically. By the use of properly designed apertures, such a scanning technique may be applied either to a ln $Z(t)$ record or to a ln' $Z(t)$ record to produce the same output $P_r(t)$. Such a scanning system is illustrated in FIG. 19 where the scanning is accomplished by means of a wide variable-density aperture in which the density varies along the "length" or time axis of the aperture. The application of such a system to a derivative record will be described first.

The system illustrated in FIG. 19 is similar to that illustrated in FIG. 18 except that the narrow slit 66 of FIG. 18 is replaced by a variable-density waveform aperture 466 and the integrator circuit 83 and the seismic pulse network 75 of FIG. 18 are omitted. In this case the output of the preamplifier 72 is fed directly to the input of the equivalent seismometer 78. An enlarged detail view of the variable-density aperture 466 is illustrated in FIG. 20.

The waveform aperture 466 of FIG. 20 has three different portions. The edges 467 and 468 of the aperture are semi-transparent, tapering in density to opaque parts remote from the edges. The central portion 469 exhibits a variable-density characteristic to the passage of light. More particularly, the optical transmission characteristic of the central portion 469 is uniform in a direction transverse to the time axis but varies along the time axis in accordance wtih the undulations of the initial seismic pulse 475. In this particular embodiment the pulse 475 has the form $P_i(t)$ exhibited by the primary seismic pulse emitted by the charge of dynamite during the taking of a field seismogram. In this case the more dense portions of the aperture 469 occur in the regions of positive excursion of the waveform 475, while the less dense portions occur for the negative swing of the waveform 475. The tapered parts have lengths long compared with distances between alternate lobes of the seismic pulse.

It should also be noted that the waveform 475 and the corresponding variations in the density of the aperture 466 are plotted with time increasing to the left as indicated by the arrow. When arranged in this manner, the waveform aperture 466 may be placed face outward in the apparatus of FIG. 8 in place of the slit 66. In so doing, the film strip graph 52 is replaced by a derivative record 52', the transverse deflections of which are proportional to the time derivative of the logarithm of the acoustic impedance Z or any of its components such as the interval velocity $c$ or the density $\rho$.

It is important to note that the form of the pulse recorded in variable density form on the waveform aperture is the same as the form of the pulse generated by the pulse network 75 in response to a step function.

As the derivative record 52' is moved past the waveform aperture 466, the amount of light received by the photocell 70 from any small lineal transverse part of the aperture varies in accordance with the instantaneous products of the heights of the opaque portion of the modified film strip graph and the optical density of the portion 469 of the aperture 466 at the corresponding position. In this way the total quantity of light received by the photocell 70 varies in accordance with the sum, or integral, of all of the vertical displacements of the derivative record which are viewed at that instant through the variable-density aperture 466, and each of these light components is, in effect, multiplied by the value of the optical transmission of the corresponding segment of the portion 469 of the aperture 466. By virtue of the tapered parts, the detrimental effects of abrupt edges are very largely overcome. In effect, the tapered parts prevent the introduction of strong transients that would otherwise be produced by the abrupt edges. The tapered parts reduce the amplitude of such transients and tend to introduce only low-frequency components, the longer the taper, the lower the frequency. By making the length of the tapers many times the lobe intervals, these low-frequency components may be located below the transmission band of the amplifier 81 so that they are highly attenuated before being impressed on the galvanometers $g_4 \ldots g_8$.

Thus, except for edge effects, at any instant corresponding to travel-time $t$, the intensity of the illumination reaching the photocell 70 is given by the following expression:

$$I(t) = \int_{t'}^{t''} \ln' Z(\tau) P_i(t-\tau) d\tau \qquad (24)$$

where $t'$=time on record 52'adjacent the edge 467 of the opaque portion=$t$;
$t''$=time on record 52' adjacent the edge 468 of the opaque portion $468=t+\tau_0$;
$\tau_0$=length of seismic pulse as represented by space between edges 467 and 468.

As is well known, the expression $P_i(t-\tau)$ is the same as $P_i(t)$, except that identical events in the later-occurring wave $P_i(t-\tau)$ are delayed by a time interval $\tau$ relative to the same event in the earlier-occurring wave $P_i(t)$.

It will be noted that Equation 24 is the same as Equation 19. Thus, even though no seismic pulse network is employed, a voltage $P_r(t)$ is generated which represents the train of seismic waves returned to the surface of the earth by the various reflecting strata. This voltage is then fed through the equivalent seismometer in the same manner as previously described to produce a synthetic seismogram.

In another method of employing a waveform aperture, the derivative record 52' is prepared in the form of a variable density record, while the aperture 466 is in the form of a variable area record. In such a case the optical density of the derivative record varies along its length. At each position along the length of the record, the density is proportional to $\ln' Z(t)$. In such a case, a variable area aperture in the form of the initial seismic pulse $P_i(t)$ is plotted on a record and this record is blacked in on one side of the wave as illustrated in FIG. 21. In this case, edge effects are avoided by tapered variable area portions extending away from the pulse area.

When such a variable density derivative record is scanned by advancing it past the variable area aperture 466, the output of the preamplifier 75 is also proportional to the reflected wave function $P_r(t)$.

When employing apertures of the type illustrated in FIGS. 20 and 21, the optical system which illuminates the aperture is adjusted in such a way that the entire width and height of the aperture is uniformly illuminated. In this way all portions of the waveforms occurring at various positions in the aperture have their proper proportional effects in producing light intensity variations in the beam which falls on photocell 70.

The term represented by Equation 24 is known as the running cross-correlation function between the terms $\ln' Z(t)$ and $P_i(t)$. It will be noted that all of the methods previously described herein produce at the input of the equivalent seizmometer a signal which is the running cross-correlation function of $\ln' Z(t)$ and $P_i(t)$. In one method this cross-correlation function is produced by scanning a record of $\ln Z(t)$ with a narrow slit and employing a seismic pulse network to produce the desired correlation operations. In the other methods a derivative record and a waveform density aperture are employed to produce the desired cross-correlation operation.

It will also be understood that the running cross-correlation function may be generated by employing a variable density derivative record 52' and a variable density aperture 466. It is thus seen that such a cross-correlation function may be conveniently produced by employing a derivative record and an aperture, at least one of which is of the variable density type and the other or which may be either of the variable density or variable area type.

As indicated by the manner in which Equation 19 was derived, the signal appearing at the output of the seismic wave pulse network 75 of FIG. 8 represents the sum of a series of component voltages having the form of $P_i(t)$ generated at different times as corresponding parts of the well log $\ln' Z(t)$ pass the slit 66. In the system in which the derivative log $\ln' Z(t)$ is scanned by a waveform aperture of either of the types described above, this same summation occurs. However, in the latter case the waves are generated simultaneously in the photocell by the simultaneous appearance of different parts of the derivative record at different time distances along the time axis of the waveform aperture. In both cases the components have the proper amplitudes and signs corresponding to the reflection coefficients of the formations at the depths to which the components correspond. Though the composite voltage wave $P_r(t)$ appearing at the output of the system at any one time is actually generated by physically different systems, the time relationship between the components having the shape of the primary seismic wave pulse and the amplitudes of these components is the same in both systems. Thus, even though quite dissimilar means are employed in the two systems, they both involve the same underlying principle in which the same component signals are generated and are combined to form the voltage $P_r(t)$ representing the reflected waves recorded in the synthetic seismogram.

It can also be shown that the same results can be achieved by scanning a $\ln Z(t)$ record 52 with a wide aperture which represents the derivative of the initial seismic pulse, that is, $P'_i(t)$. In this case, to produce the desired cross-correlation it is only necessary to replace the slit 66 of FIG. 8 with a variable density aperture like that of FIG. 19, in which the density along the length of the aperture varies not as a function of $P_i(t)$, but as a function of $P'_i(t)$. Again, by suitable modification a variable density record may be substituted for the record 52 and then, if desired, a variable area aperture may be employed. In such a system the formula for the output wave takes the form $$P_r(t) = 1/2 \int_0^t \ln Z(t) P'(t-\tau) d\tau \qquad (19')$$

where $P'(t-\tau)$ is the derivative of $P(t-\tau)$ with respect to time $t$. This expression has the same value as that of Equation 19.

*Multiple head systems*

It should be understood that the photoelectric scanner unit 50 of FIG. 8 may be replaced by a unit employing a magnetic tape in place of the film strip graph 52. In such a case, the magnetization impressed upon the magnetic tape is caused to vary in accordance with the logarithm of the amplitude of the acoustic impedance of the formation surrounding the borehole recorded versus the seismic wave travel-time. The magnetic tape, which is substituted for the film record 52 in the scanner 50, is moved at a constant speed past a magnetic reproducer head which is substituted for the slit 66 and photocell 70. As the tape is scanned, the signal originally recorded on the magnetic tape is reproduced. This signal is then applied to the seismic pulse network 75 in the manner shown in FIG. 8.

An additional scanning system having great utility in the practice of the present invention resides in the use of more than one reproducer head in playing back the magnetic tape.

As fully disclosed and claimed in copending patent application Ser. No. 349,407, filed Apr. 17, 1953, now Patent No. 2,916,724, the action of an electric filter may be approximated by a plurality of magnetic playback heads paced apart along the magnetic track by selected distance, the outputs of the individual magnetic heads being combined to produce a combined output signal. Such a system is schematically represented in FIG. 22. In this embodiment a magnetic tape 501 is carried by driving and driven rollers 502 and 503 respectively. A motor 72 is connected to the driving roller 502 to cause uniform rotation thereof at a predetermined speed. Previously recorded on the magnetic tape 501 is a magnetic trace 510 schematically shown as a dotted line in the figure. The magnetization along the track 510 varies in accordance with the instantaneous value of the logarithm of the acoustic impedance Z obtained from well measurements. Magnetic playback heads 512, 513, 514, and 515 are schematically shown in contact with the tape at the transverse position of the magnetic track 510. The outputs from the respective magnetic heads 512 . . . 515 pass through corresponding polarity reversing switches 532 . . . 535 respectively and thence to corresponding variable attenuators 522 . . . 525. Each of the variable attenuators 522 . . . 525 may be used to control the amplitude or gain of that particular channel and thereby controls the amount of the signal picked up by the corresponding magnetic head that is passed on by the attenuators to the adding network 575.

The attenuated outputs from the attenuators 522 . . . 525 are applied to the inputs of an adding circuit 575 which functions to produce an output signal which is the sum of the instantaneous amplitudes of the various input signals thereto. The output from the adding circuit is available on line 576. Thus when considering only one magnetic pickup head such as 512 of the system of FIG. 22, the playback process for that channel functions in a manner analogous to the photoelectric optical scanning system 50 of FIG. 8. However, when the remaining magnetic pickup heads 513, 514, and 515 are considered in conjunction with their corresponding channels and the adding circuit 575, the system as a whole acts as a frequency selective filtering device, all in accordance with the disclosure of the aforesaid Patent No. 3,016,724.

As indicated above, the process of carrying out the invention involves performing the continuous running cross-correlation between the variables ln' $Z(t)$ and $P_i(t)$ or the variables ln $Z(t)$ and $P_i'(t)$. In the embodiment of FIG. 22 this process is carried out to a close approximation by adjusting the time displacements $\Delta t_1$, $\Delta t_2$, and $\Delta t_3$. Between the respective reproducing heads 512 . . . 515 and also by selectively adjusting the settings of the gain controls 522 . . . 525 and the positions or settings of the polarity reversing switches 532 . . . 535. In essence, the composite filtering effect of the system of FIG. 22 represents to a close approximation the filtering effect of the seismic pulse network 75.

In order to illustrate how these adjustments are determined, reference is made to FIG. 23a, which illustrates a representation of the shot pulse $P_i(t)$ plotted as a function of time. As previously described, the shape of this pulse may be determined by several means such as observing it directly in the borehole during the making of an actual field seismogram. The graph illustrated in FIG. 23b represents the derivative of the curve of FIG. 23a and is plotted to the same time scale. It should be observed that whereas $P_i(t)$ has only three lobes, the derivative of $P_i(t)$ exhibits four lobes.

The vertical lines $1_1$, $1_2$, $1_3$, and $1_4$ in FIG. 23b have heights which are proportional to the areas of the corresponding lobes of the waveform $P_i'(t)$. Moreover, the lines $1_1$ . . . $1_4$ are positioned along the time axis at points which pass through the centroids of the corresponding lobes. Thus the lines $1_1$ and $1_2$ are separated by a small time interval $\Delta t_1$ while the lines $1_2$ and $1_3$ are separated by a small time interval $\Delta t_2$, and the lines $1_3$ and $1_4$ are separated by a small time interval $\Delta t_3$.

In one way of practicing the invention by employing the apparatus of FIG. 22, the distance between adjacent magnetic playback heads 512 and 513 is adjusted so that the time interval represented between them is equal to $\Delta t_1$. Likewise the time separation of heads 513 and 514 is made equal to the differential time $\Delta t_2$, etc. And likewise the time interval between the heads 514 and 515 is made equal to the differential time $\Delta t_3$.

The time interval spacing thus determined depends upon the time scale of the recording. In other words, if the record 501 bore a record of the wave represented in FIG. 23b, the time spacing of the heads would be the same as the time spacing of the lobes. However the heads would be arranged in the reverse order relative to the direction of time progression of the moving record, that is a wave on the record would arrive at the heads 512, 513, 514 and 515 in the sequence named. This relationship is indicated by the arrangement of the heads 512 . . . 515 shown in FIG. 22.

Furthermore, the amplitude or gain control 522 is adjusted to be substantially proportional to the height of the line $1_1$ in the first lobe of the wave $P_i(t)$. Similarly, the gain controls 523, 524, and 525 are set proportional to the heights of lines $1_2$, $1_3$, and $1_4$. Finally the polarity switches 533 and 535 are operated to reverse the polarities of the channels corresponding to the second and fourth lobes relative to the channels corresponding to the first and third lobes.

Setting the head separations and the gain controls and the polarity switches in accordance with the areas and centroid positions and the polarities of the lobes of the waveform of FIG. 23b causes the frequency response characteristic of the playback system of FIG. 22 as measured from the magnetic trace 510 to the output 576 to exhibit a characteristic which closely approximates the frequency spectrum of the wave of FIG. 23b. In this way the signals present on magnetic trace 510 are effectively filtered when passing the magnetic head group in a way similar to that which would occur if the signals were played back with only one magnetic head and then passed through an electric filter whose frequency response characteristic is the same as the overall response characteristic of the system of FIG. 22. In other words, the motion of the magnetic track 510 past the head group causes the formation of a signal at output 576 which is substantially the running cross-correlation between the signals recorded on the track and the wavelet approximated by the filter comprising the head pattern and gain control settings. In this particular case the correlation occurs between the derivative wavelet $P_i'(t)$ and the logarithm of the acoustic impedance Z. Since this is the correlation indicated by Equation 19', the system of FIG. 22 produces at the output 576 a close approximation to the desired synthesized seismic wave motion $P_r(t)$.

Similar results may be obtained if the signal recorded on magnetic track 510 of the tape 501 is in the form of the derivative of the logarithm of the acoustic impedance Z plotted as a function of travel-time. In this case three heads 512, 513, and 514 are employed, and the setting of the heads and the corresponding gain controls 522, 523, and 524 and the corresponding polarity switches 532, 533, and 534 are made respectively in accordance with the areas and centroid positions and polarities of the three lobes of the wavelet $P_i(t)$ represented in FIG. 23a. Though the particular head filters described employ one head at the centroid of each lobe, it will be understood that two or more heads may be employed for each lobe and that the heads may be spaced in various ways to obtain effective filtering. In any event, best operation is obtained by employing a total of at least three or four lobes, since a seismic wave pulse has three lobes.

It will be understood that in the aforedescribed magnetic tape systems, any desirable method of recording the information on the magnetic tape may be used. For example, frequency modulation or amplitude modulation or pulse width modulation or pulse code modulation may be employed in order to provide good low-frequency response. If such modulation techniques are used, suitable complementary demodulator or decoding circuits (not shown) would be inserted in each of the playback channels in order to effect suitable demodulation of the modulated wave picked up from the magnetic tape 501 by the heads. The demodulators or decoders would be connected between the magnetic heads 512 . . . 515 and the polarity switches 532 . . . 535. It will also be understood that, although the portion of the preferred embodiment illustrated in FIG. 8 comprising the equivalent seismometer 78, seismograph amplifier 80, cathode follower 82, and recording oscillograph O are not shown in the system of FIG. 22, nevertheless these elements are employed with the latter system in order to produce a synthesized seismogram trace of the type illustrated in record 90 in FIG. 8.

Although the above description of a multiple magnetic head-filtering playback system relates directly to the use of a magnetic tape, similar results may be obtained by employing a plurality of optical slits displaced from one another by suitable time distances and arranged to scan a strip film graph of the type illustrated in FIG. 8. Such a system is illustrated in part in FIG. 24. In this case the optical system would be adjusted so as to uniformly illuminate the different slits 512', 513', 514', and 515' spaced apart along the periphery of the wheel 56 at spaced intervals which represent the time differences $\Delta t_1$, $\Delta t_2$, $\Delta t_3$ between the lobes of the wavelet $P_i'(t)$ whose approximation is employed in the scanning process. Moreover, each of the optical slits 512' . . . 515' is arranged with a separate photocell 70a, 70b, 70c, and 70d and a common light source 58 in order to produce separate individual electrical output signals, each of which varies in direct proportion to the amount of light passing through the corresponding slit at any instant. Furthermore, the preamplifiers 72a, 72b, 72c, and 72d connected with the respective photocells 70a, 70b, 70c, and 70d would each be provided with a corresponding amplitude or gain control and also a polarity reversing switch of the general types illustrated in FIG. 22. In this way, the polarity and the gain or amplitude associated with each channel of the scanning system may be adjusted in accordance with the principles explained in relation to the magnetic tape system and these signals may be fed to a common adding network 575' to produce a synthetic seismogram signal in the form of a voltage wave $P_r(t)$.

If a derivative record is employed, three slits are employed spaced apart by time intervals corresponding to the spacing of the lobes of the primary seismic wave pulse $P_i(t)$. In this case too the output signal has the form $P_r(t)$ of the reflected wave train traveling upward to the surface of the earth.

*Seismic pulse change with depth*

In the foregoing disclosure it has been assumed that the downwardly traveling seismic wave pulse produced by the charge of dynamite has a fixed shape regardless of depth. The making of this assumption is practical, since the shape of the seismic wavelet propagated downwardly in the earth is not found to vary widely with depth or travel time. Actually, due to dispersion, absorption, and other effects, analysis of the shape of the seismic wavelets measured at different depths in the borehole during a well velocity survey sometimes indicates changes of a substantial nature. In an actual survey the major frequency component of the seismic wavelet observed in the borehole varied from a value of 77 c.p.s. at a depth of 1,000 feet to a value of 53 c.p.s. at a depth of 5,000 feet. Although the decrease in frequency with increased depth is not a smooth curve, it is nevertheless a generally decreasing value as a function of the depth in the hole.

In the normal synthesis procedure disclosed hereinbefore, the seismic pulse shape measured at some mid-depth in the borehole would be employed to determine the characteristic of the seismic pulse network. However, in cases where substantial variations of wavelet with depth are known to occur, it will be understood that better results may be obtained by varying the characteristics of the seismic pulse filter in accordance with the observed change in wavelet form with depth or travel-time. A physical method for carrying out this process is schematically illustrated in FIG. 22 wherein it will be recalled that the separations between adjacent magnetic heads 512 . . . 515 are adjusted in accordance with the time displacements of the centroids of the adjacent lobes of the waveform being approximated by the combination magnetic head filter system. In the present case the magnetic playback heads 512 . . . 515 are mechanically mounted in such a way that they can be moved relative to one another along the axis of motion of the belt 501 during the playback of the magnetic track 510. In order to effect such movement, a suitable cam-operated mechanism 580 may be provided and it may be coupled to the tape drive motor 572. In this way, the positions of the heads 512, 513, 514, and 515 may be automatically varied during the synthesizing process as a function of depth or travel-time in the borehole.

In practice the change in the major frequency component or period of the seismic wavelet measured at different depths in the borehole during the well velocity survey is determined. From this data the corresponding values of the positions of the lobes and the spacing $\Delta t_1$, $\Delta t_2$, and $\Delta t_3$ between them and the location $\Delta t_0$ of the first lobe are determined as a function of travel-time. The individual cams that determine the positions of the heads 512, 513, 514, and 515 are so shaped as to vary those positions to correspond to the varying values of $\Delta t_0$, $\Delta t_1$, $\Delta t_2$, and $\Delta t_3$ during the playback operation. At the beginning of the playback process of the recording 501, the time displacements between the respective heads are at a minimum and, in particular, are adjusted in accordance with the shape of the waveform observed at a shallow depth in the well. As the record 501 moves past the pickup heads, the spacing of the heads from a zero time reference position $T_0$ of the heads and the time displacements between the respective heads are slowly increased by the cams in accordance with the change in period or major frequency component of the wavelet observed at different depths in the borehole. For more accurate simulation of the change of the seismic wave pulse with depth, the settings of the gain controls 522 . . . 525 are also varied.

In this way, the shape of seismic pulse representation of the synthetic system is caused to vary in direct accordance with the variation in the shape of the seismic pulse actually observed at different depths in the borehole. The resulting synthetic seismograms produced by this system more nearly approximate field seismograms. Similar results may be obtained by displacing the slits of and altering the gains of the amplifiers of the system of FIG. 24 as a function of seismic wave travel-time as by means of a motor 572' and a control unit 580'. And similar results may also be obtained by altering the settings of the elements of the filter forming the seismic pulse network 75 of FIG. 8 as by means of a control unit 75a driven by motor 70 as a function of seismic wave travel-time.

Another method employing less elaborate equipment may be used for effecting similar results. In this simplified method, several seismograms are synthesized with the apparatus of FIG. 8, for example, and each differs from the next in that the characteristics of the seismic pulse network are set to approximate the seismic pulse observed in a limited depth interval in the well. For example, three seismograms may be synthesized, correonding respectively to first, second, and third portions the film strip graph. In general, the frequency response curve of the seismic pulse network progressively moves to lower and lower frequencies for the first, second, and third seismograms respectively. In this way, a portion of each of the resulting seismograms constitutes a "best fit" to the actual case over a different depth range.

this simplified method, the records made over successive depth ranges may be spliced to produce a composite record over a large depth range.

*nthesis of reflection seismograms from resistivity logs*

Some of the advantages of the invention are obtained hen seismograms are synthesized from resistivity logs tead of from acoustic impedance or interval-velocity ;s. In fact, synthetic seismograms produced from both es of logs bear a very marked resemblance. The ison for this is probably that a strong correlation often sts between the interval-velocity log and the resistivity ; of a well as indicated in FIG. 2. In this figure the erval-velocity $L_3$ is plotted as a function of depth orizontal scale) and the resistivity log $L_4$ is similarly itted. As aforedescribed, the interval-velocity data : measured by means of a system employing short ervals of the length of the well for a single measurent, such intervals being, for example, ten feet. Hence interval-velocity $L_3$ exhibits a high definition as evinced by the many undulations therein. As is well own to the art, the resistivity log $L_4$ results from the ermination of the current flow induced in the formations by the application of a known fixed potential to air of spaced electrodes which are moved in unison out six feet apart along the length of the borehole veyed. The latter measurement is made continuously 1 hence the resistivity log $L_4$ exhibits a smoother charaeristic than the interval-velocity log $L_3$ which is plotted m a series of successive short contiguous intervals. th logs have high definitions, and a close correlation sts as is apparent from the general undulations of the ) curves.

t has been discovered that any one peak or valley in interval-velocity curve may not of itself produce a istantial deflection of the trace obtained from the put of the seismic pulse network during the synthesng process. Due to the latter phenomenon of the thesis process, a perfect correlation between the curves and $L_4$ is not required in order to produce substantial ilarities in the traces synthesized from these two ves.

n a test case made in an area where the reflection mograms were considered to be of poor quality, film p logs were prepared of the logarithm of the resistivity well as that of the interval velocity, each plotted as inear function of the total seismic wave travel-time the well as determined from the running summation the small interval-travel times measured in the well. :h of these film strip logs was then employed in a thesizing system of the type illustrated in FIG. 8, l synthetic seismograms were produced therefrom. imples of portions of the records obtained are shown FIG. 25, where they are compared with a portion of ield seismogram recorded at a single ender spread t was located 2100 feet from the top of the borehole which the logs were made. In FIG. 25 only the es representing the output signals from the seismoph amplifier are shown. In both the lower and upper ups of traces corresponding respectively to interval ocity and resistivity log data, the settings of filter works 81 of the seismograph amplifier 80 were the ie as those employed in recording the field seismogram wn in the middle of FIG. 25.

Comparison between the synthesized traces in the upper lower portions of the figure reveals that they are y nearly alike, particularly in the regions blacked in.

Certain reflections may be picked out on all three of the sets of traces which occur at substantially the same times and have similar wave shapes. For example, reflection 601 of the traces produced from the interval-velocity data is seen to correlate both in time and wave shape with the reflection 601' on the field reflection seismogram. Moreover, a reflection-like event 601'' occurs at substantially the same time on the traces synthesized from the resistivity data, and the waveform is similar to the corresponding events shown below it.

It is thus seen that a close correlation exists between synthetic seismograms produced from interval-velocity logs and resistivity logs. It is thus possible to successfully synthesize seismograms from resistivity data alone. As a result, the production of seismograms from resistivity data may often be made at lower cost than would be required to produce such seismograms from interval-velocity data. This result arises from the fact that at the present state of the well logging art, the cost of running an interval-velocity survey is considerably higher than the cost of running a resistivity log in a borehole. Moreover, large numbers of resistivity logs taken over the past decades are available for the production of synthetic seismogram records in accordance with this invention.

From an examination of FIG. 25, it is apparent that even though the field seismogram itself is of poor record quality, traces on that record can be closely correlated with synthetic seismograms produced from logs of a distant well. By correlating such a field seismogram with a synthetic seismogram, it is possible to determine the relative depth of particular strata at the well and at points remote therefrom. Such a correlation method involves, in effect, the steps of making a synthetic seismogram, correlating the synthetic seismogram with a field seismogram in order to identify reflections on the field seismogram which also appear on the synthetic seismogram, and then from the two records determining the relative travel-times to a common stratum at the location of the well for which the synthetic seismogram was made and a location in the neighborhood of the spread at which the field seismogram was recorded.

*Correlation*

It should be observed that one of the most useful results obtained from practicing the present invention lies in the fact that synthetic seismograms may be employed to correlate reflection seismograms directly with well lithology. In the past, reflections have ordinarily been assumed to be produced by the upper surfaces of various of the subsurface strata, such as the Viola limestone for example. Results obtained with the present invention indicate that in many cases such interfaces are often of little importance in this regard. In fact, major reflection events often occur as a result of the cumulative or integrated effects of alternating beds of high and low velocity materials. By directly correlating the transformed well log of a representative well in the area with the field seismograms taken in the region surrounding the well, these various effects are brought to light. By means of this invention, a synthetic seismogram may be employed to determine which characteristics of the reflection wavelets on the field seismogram correlate with distinctive changes in the transformed well log. Thereafter this information is employed by the seimic interpreter to make similar correlations between the actual field seismograms obtained at various locations in an area and a well log obtained at a reference location or between such actual field seismograms and what might be called the "filtered" well log, the synthetic seismogram.

Usually the correlation of a synthetic seismogram with a field seismogram is accomplished by placing the two seismograms side by side and noting the occurrence of substantially identical waveforms on the two. The times of occurrence of the two similar waveforms on the two records are then measured on the seismograms, and these measurements are employed in the calculation of depths of the strata that produce the reflections.

The correlation of a synthetic seismogram and a field seismogram may also be accomplished mechanically as by the apparatus illustrated in FIG. 26. For example, a selected portion of a synthetic seismogram which contains correlatable reflections may be transformed into a variable-density record 66a resembling that of FIG. 20, in which the density of the selected portion of the record along its length varies in proportion to the amplitude of the galvanometer displacement, and in which the density is tapered beyond the edges for distances long compared with the average spacing between alternate lobes on the record 66a. And the field seismogram may be converted to a variable-density record or it may be blacked in on one side to produce a variable-area field seismogram 52a having the appearance of the log 52 of FIG. 8. The variable-density or variable-area record may also be made by averaging the traces recorded on several galvanometers instead of employing only one trace. In this way the effects of noise and other waves are reduced. In either event, such a transformed synthetic seismogram 66a is placed at the position of the slit 66 of the scanner 50, and the field seismogram 52a is placed on the drum, as shown in FIG. 26. In this case the records are placed side by side with travel-time increasing in the same direction.

The field seismogram 52a is driven slowly past the synthetic seismogram 66a. In this case the output of the photocell 70a is applied to a D.C. amplifier 72a, the output of which is employed to operate an oscillograph $O_a$ thereby producing a running record 90a of the cross-correlation existing between the fragmentary synthetic seismogram 66a and the field seismogram 52a. On this record 90a abscissae represent time differences between the two records 52a and 66a and ordinates represent the value of the cross-correlation function as a function of this time difference. The point of the resultant cross-correlation graph at which the cross-correlation function has a maximum value represents the point when best correlation between the field seismogram and the synthetic seismogram is obtained. The field seismogram 52a may then be moved to a position opposite the synthetic seismogram 66a to bring corresponding parts into the registry corresponding to the best condition of correlation. The travel-times of waves recorded on opposite parts of the two seismograms are then measured to complete the correlation. The same process can also be used to correlate different traces on the same or adjacent seismograms.

In any event, whether the correlation is obtained with such a device or whether it is obtained merely by placing the seismograms side by side and comparing the reflections on the seismograms visually, the time measurements so obtained may be employed to identify strata producing reflections on the field seismogram.

By means of this invention it has been determined that optimum correlation between a seismogram and a well log can be obtained by displacement of the well log by a predetermined amount along the length of the seismogram. The amount of displacement required to achieve this result depends somewhat on the shape of the seismic wave pulse that produced the seismogram, whether it be a field seismogram or a synthetic seismogram. The principles underlying this correlation technique are indicated by the data illustrated in FIG. 27.

Referring to FIG. 27, there is illustrated a well log $L_7$ of the logarithm of interval velocity corresponding to a hypothetical lithological log $L_8$. A synthetic seismogram $S_7$ produced by scanning the hypothetical well log $L_7$ is also shown. It is assumed here for purposes of illustration that the well log $L_7$ has been plotted as a function of seismic wave travel-time. The corresponding synthetic seismogram $S_7$ is plotted on the same time scale. Thus a part of the seismogram trace $S_7$ appeared at the output of the oscillograph O of FIG. 8 at the same time that the part of the log directly beneath it passed the slit 66. In the upper part of the figure, the well log $L_7$ has been shifted to the right by a predetermined time displacement $\Delta T$ equal to the duration of the first two lobes of a pulse $P_7$ produced by a sharp step $E_7$ in the well log. By displacing the well log in this way a strong correlation between the synthetic seismogram and the well log becomes apparent. Points of correlation are marked with small circles. In this well log, it will be noted that wide spacings between these flex points on the seismogram trace $S_7$ correspond to thick beds, while narrow spacings between these flex points correspond to thin beds. It will also be noted that the peaks on opposite sides of correlatable flex points of the synthetic seismogram correspond respectively to high and low velocity zones of the formations.

In some cases displacement of the well log by a time interval equal to the duration of three lobes may produce the best correlation and in particular produce a strong correlation between the polarity of the lobe and the relative magnitudes of the interval velocities of the formations producing the lobes in the seismogram. In such a case a polarity reversal occurs and peaks on the seismogram correspond to formations having a low velocity compared with formations on either side and troughs on the seismogram correspond to formations having a high velocity compared with formations on either side.

Once having measured the lobe widths of a seismic wave pulse, a field seismogram may be similarly displaced relative to a well log and a correlation obtained between specific zones or formations in the well log and specific waves or lobes of waves in the field seismogram. Shaded areas of seismograms in FIGS. 9 and 25 indicate such lobes on both synthetic and field seismograms. Such correlation is illustrated by reference to FIG. 28, which shows a film strip graph 352 of a part of a well log plotted adjacent the synthetic seismogram output trace 353 produced therefrom by passage through a seismic pulse network and a field amplifier as described above. A time correction has been applied to account for the filter and lobe delays. The high degree of correlation existing between the two curves is evident. As observed here, peaks on the seismogram indicate areas of increased velocity and troughs indicate areas of decreased velocity. It will be seen that a narrow, exceedingly high and sharp spike such as indicated at 354 has substantially no overall effect upon the resulting trace 353. Moreover, the exceedingly low frequency variation given by the dotted line 355 appears not to appreciably affect the output trace 353. However, variations whose frequency components lie substantially within the pass-band of the seismic pulse network are seen to produce substantial output waves such as illustrated by the correlating lines 356.

As indicated by the correlation between the resulting seismic trace and the initial film strip graph, it appears that only the general "mid-band" undulations of the film strip graph are important in the production of the final seismic traces. Hence, in approximating the reflection coefficient as a function of depth, it is merely necessary to provide a film strip graph which exhibits the general properly timed "mid-band" undulations of interval velocity of acoustic impedance measured in the well borehole. The very high frequency components (the sharp "spikes") and the very low frequency variations are not very important in the production of the final trace. However, for best effects, to assure the production of synthetic seismograms from any log which will correlate favorably with field seismograms, the distance over which the log characteristic is measured should be less than a fraction, such as one-fourth, of the wavelength of the seismic pulse. Expressed differently, the log itself should be characterized by a frequency spectrum which includes a band of frequencies that contain most of the energy in a seismic pulse. This result is achieved in an interval-velocity log by measuring interval times over successive small distances, such as ten feet, throughout the depth range of interest. Such a spacing between a source and receiver or between successive receivers is less than about one-fourth the dominant wavelength of reflected waves that are normally recorded in a field reflection seismogram.

In some cases of reflection seismograph prospecting it may be desired to map beds of considerable thickness, such as beds 200 to 500 feet thick. In this case, use is made of seismic wave components of comparably long wavelengths, and low frequencies, such as waves having a wavelength of about 400 to about 1000 feet. In such a case a shooting technique is employed to supply the necessary low-frequency seismic pulse energy, and a seismograph recording system is employed that transmits adequate amounts of low frequency energy. Such low-frequency components may be generated, for example, by employing much larger charges of explosive than usual and firing them at shallower depths. In such cases the overall frequency pass-band may be quite broad, and a certain amount of phase distortion may occur. In general, where phase distortion is present, low-frequency signals are delayed more in time than high-frequency signals. While this effect may not be serious for relatively narrow band width transmission characteristics, it becomes more serious for very broad band widths. Hence it may be desirable to introduce some form of phase distortion correction into the overall seismograph system, such as that described in copending patent application Ser. No. 2,234, now Patent No. 3,045,207.

It should furthermore be recognized that when the film strip graph 352 exhibits a sustained periodic variation having a period substantially equal to the period corresponding to the frequency of minimum attenuation of the seismic pulse network, a "resonance" or "tuning effect" occurs. This effect is illustrated in FIGS. 28 and 9, wherein the reflections 357 and 105 exhibit a rising amplitude characteristic with time. Such a result may arise where alternating low and high velocity beds such as sand and shale have approximately the proper thicknesses and velocities for producing the tuning or resonance effect. It will be recognized that this effect affords a very valuable method for delineating known beds by means of their characteristic reflection waveforms once the correlation of field seismograms with a well log has been established through the medium of synthetic seismograms. By taking advantage of the correlation existing between a synthetic or field seismogram and a well log, it therefore becomes possible to actually trace a particular formation from one field seismogram to another throughout the area under investigation. Furthermore, by measuring the changes in the length of a lobe on field seismograms from one location to another in the area, the degree of thickening and thinning of beds may be detected.

Furthermore, once a correlation has been established in an area between lobes of a particular sign, either positive or negative, and high velocity zones or low velocity zones, as the case may be, it is possible to determine whether it is a high velocity zone or a low velocity one whose thickness is changing throughout the area. In this way, if it is known from other data that a high velocity zone is an oil sand, then by measuring the duration of the corresponding lobe of the seismogram from one point in the area to another and plotting these measurements, a map may be produced showing approximately how the thickness of the oil sand varies throughout the area.

*Synthesis of stratigraphic changes*

Many useful studies of earth formations may be made employing the present invention. For example, it is possible to synthesize the effect of the lateral reduction in the vertical thickness of a bed such as would occur in a "pinchout." In order to accomplish this end, the film strip graph is modified repeatedly from the making of one synthetic seismogram to another by the removal of a small segment thereof at the point at which the stratum in question exists. Hence as a set of synthetic seismograms is produced, each successive synthetic record exhibits effects of slightly lesser thickness of the stratum and therefore corresponds substantially to a field record obtained at a point positioned laterally over a corresponding part of the bed of lesser thickness. Of course, it is not only possible to remove portions of the bed, but to add other portions as well and thereby to study the effect that any given change in characteristic of a bed of interest would have on field seismograms.

In another instance it may occur that a particular stratum is observed in the log of one well, while it is absent from the log of an adjacent well. For this case it is of interest to synthesize a series of records representing the seismograms that would be obtained a spaced points between the two wells. First a seismogram is synthesized from the strip graph from the well in which the layer of interest is found. Then a seismogram is made from the strip graph after a predetermined portion of the part of the log corresponding with the bed of interest has been removed. This process is then repeated a number of times with other predetermined portions removed. In this way the effect of gradually removing or "pinching out" the bed between the two well locations may be synthesized in a series of records. Moreover, the resulting records may be compared with actual field seismograms recorded at various locations in the area under investigation, and when good correlation of waveform of the field records and synthetic records is observed, it may be concluded that the thickness of the bed producing the reflection in the field record corresponds to the thickness of the hypothetical bed producing the synthetic seismogram with which the field record correlates. In this way the lateral limits of a productive formation may be determined.

Such mapping techniques are very important, since they aid in determining the limits of an oil field within which new wells are most likely to be productive.

*Use of depth logs*

In the various systems disclosed above it has generally been assumed that the results of a velocity survey are available. In other words, it has generally been assumed that the relationship between travel-time and depth is known and that prior to scanning, the well log is plotted in terms of travel-time. For example, a synthetic seismogram in which the reflected waves are displayed as a function of travel-time may be obtained in scanning a depth log in the system of FIG. 8 by varying the speed of the motor 71 during the filtering process. This result may be accomplished, for example, by adjusting the power supplied to the motor 71 through a rheostat 69 in such a way that the depth of the part of the record being scanned at any time corresponds to the travel-time of the oscillograph trace being recorded. To vary the displacement of record 52 in such a way, the rheostat 69 is adjusted to cause the motor 71 to rotate at a rate which is proportional to the average velocity with which waves travel through formations at the depth of the part of the record 52 which is being scanned.

In some instances, however, it is possible to scan a well-characteristic versus depth log without changing the speed of scanning, and still obtain a synthetic seismogram which is correlatable with a field seismogram. A synthetic seismogram made in this way may be employed to make a velocity survey where such a survey cannot readily be made otherwise. Thus by means of this invention, a velocity survey may be made where a log of a well has been made, but the well is no longer available for use in the making of a velocity survey. This is particularly true where the well intersects a series of distinctive groups of beds.

Referring to FIG. 29, there is illustrated a well borehole 800 which extends into the earth through a series of distinctive groups of beds 801, 802, and 803. A log $L_6$ such as a resistivity log having distinct accentuated resistivity peaks 811, 812, and 813 is assumed to be available for this well. In this log $L_6$, resistivity is plotted as abscissae against depth as ordinates. A synthetic seismogram $S_s$ may be produced by scanning the well log $L_6$ as by means of the system illustrated in FIG. 8. A field seismogram $S_f$ produced by recording at a split spread arranged at the top of the well 800 is also shown. The well log, the synthetic seismogram, and the field seismogram are shown in side-by-side relationship adjacent the vertical section of the well 800.

In the field seismogram $S_f$, the various waves are recorded as a linear function of time, whereas in the synthetic log $S_s$ the waves are recorded as a linear function of depth. Under the assumed conditions, where distinctive groups of beds exist, the reflections due to the distinctive groups of beds stand out above the other waves that are recorded on the seismograms. For this reason, and also because the character of the waves on the synthetic seismogram and the field seismogram bear a marked resemblance, the waves having their origin in the beds 801, 802, and 803 are readily recognized on the two seismograms and readily correlated. Thus, the waves $W_1'$, $W_2'$, and $W_3'$ corresponding to the groups of beds 801, 802, and 803 are readily correlated with the waves $W_1''$, $W_2''$, and $W_3''$ on the field seismogram.

Normally, the velocity of seismic waves gradually increases with depth, though, as indicated by other data supplied hereinabove, the interval velocity actually undulates rapidly from point to point throughout the depth of the well. In any event, where it is possible to correlate the waves on the synthetic seismogram with those on the field seismogram, the time required for waves to travel from the surface of the earth to various depths may be readily ascertained. Thus, the depths $d_1$, $d_2$, and $d_3$ at which the first lobes of the waves $W_1'$, $W_2'$, and $W_3'$ appear may be plotted as ordinates, while the corresponding times $t_1$, $t_2$, and $t_3$ required for the waves $W_1''$, $W_2''$, and $W_3''$ to travel from the surface of the earth to the groups of beds and return may be plotted as abscissae in a diagram like FIG. 1. In this way, a travel-time versus depth graph is obtained.

By dividing the difference in depths of two formations by the time interval elapsed between the recording of reflections at those formations, the average velocity of seismic waves in traveling over the depth range of the formations in question is obtained. Thus, for example, the average velocity required for waves to travel from the center of formation 801 to the center of formation 802 is given by the following equation:

$$v = \frac{d_2 - d_1}{t_2 - t_1}$$

In a similar way, by dividing the depth of any bed by the time required for waves to travel from the surface to that depth, the average seismic velocity required for waves to travel to that depth is obtained. In measuring time for the purpose of calculating velocity in this way, the lobe-delay is subtracted from the observed travel-time, and if necessary account is taken of the fact that lobe-delay increases with depth because of the fact that the pulse character changes with depth. Thus, the average seismic wave velocity to the depth of the bed 803 is given by the equation:

$$v = \frac{t_3 - t_0}{d_3 - d_0}$$

where $t_0$ and $d_0$ are constants which take into account the fact that lobe-delay occurs both in the field seismogram $S_f$ and the synthetic seismogram $S_s$.

Actually it is not necessary that the distinctive groups of beds be as distinctive as indicated in FIG. 29. But if a depth log rather than a travel-time log is scanned by any one of the systems described above, successive parts of the synthetic seismogram so produced may be compared with successive parts of a field seismogram to locate easily correlatable reflections. The depths at which such reflections occur on the synthetic seismogram and the times at which they occur on the field seismogram may be employed as indicated to produce a travel-time versus depth graph.

Where depth logs and field seismograms are available at the locations of a number of wells throughout an area, travel-time versus depth graphs may be made for the different well locations. The manner in which the travel-time versus depth graphs vary throughout the area often yields valuable information regarding horizontal changes in the lithology of the subsurface formations.

Though depth logs may be utilized in the production of synthetic seismograms, it is advantageous to employ a travel-time log for this purpose, because in this way a synthetic seismogram can be readily produced which may be placed beside a field seismogram and correlated therewith visually over an extended time range. It will be understood, however, as previously mentioned, that the rate of scanning of a depth log may be varied during the scanning to produce such a synthetic seismogram.

Furthermore, the character of a synthetic seismogram produced with a particular setting of a phase shift network and a particular seismograph amplifier employed in the system of FIG. 8 varies substantially with the scale to which the different parts of the seismogram are plotted. For this reason when information as to the general nature of the variation of travel-time with depth is known for the area under investigation, it is best to make an estimate as to how travel-time varies with depth at a particular well for which a log of resistivity or other characteristic is available. Such an estimated time depth curve is shown by the smooth curve F in FIG. 31. This log is then plotted in terms of the estimated travel-times. A synthetic seismogram is then made with this log. This synthetic seismogram is then compared with a field seismogram and the discrepancies in the times of occurrence of correlatable waves is measured. These measurements are then employed to correct the estimated depth travel-time curve. The corrected travel-time versus depth curve may then be employed to plot a more nearly correct travel-time log if desired, so as to produce a synthetic seismogram which corresponds nearly with a field seismogram obtained at the location of the well.

Thus, by way of example in FIG. 30 there is illustrated a well log $L_{10}$ in which the log of a characteristic has been plotted as a function of estimated travel-time represented by the curve F of FIG. 30. Beside log $L_{10}$ there is illustrated a synthetic seismogram $S_s'$ produced by scanning this log in the manner explained above. Next, there is shown a field seismogram $S_f'$ obtained at the location of the well from which the log data were obtained. Here, it will be noted that close coincidence occurs for waves occurring in these seismograms at the depths $D_1$ and $D_4$. However, it is to be noted that on the synthetic seismogram $S_s'$ the wave occurs later than on the field seismogram at depth $D_2$. The lag of the wave on the synthetic seismogram is $\Delta t_2$. Also, it is to be noted that on the synthetic seismogram $S_s'$ the wave occurs earlier than on the field seismogram at depth $D_3$. The lead of the wave on the field seismogram is $\Delta t_3$. Accordingly, as indicated in FIG. 31, a new graph of travel-time versus depth may be ascertained by correcting the graph F at the depths $D_2$ and $D_3$ by the amounts $\Delta t_2$ and $\Delta t_3$. Where necessary corrections are made similarly at other depths. In making such corrections, account is taken of the dip of the strata and also weathering correction, and also elevation of shot point and geophones as well as other factors in order to take into account actual conditions encountered the field. The slightly irregular corrected travel-time
rsus depth graph C may be employed to produce a new
ivel-time log and the process may be repeated a num-
r of times if desired in order to increase the accuracy
the final results.

*Summary*

In a broad sense, the invention comprises the perform-
ce of the following steps: measuring a characteristic
 formations intersecting a borehole as a function of
pth; generating a signal wave that varies as a function
time approximately in the same way that a character-
ic of the formations pierced by the borehole varies with
pth or with travel-time; filtering this signal wave with
iltering device having a frequency characteristic which
proximates that of the waveform of a downwardly
veling seismic pulse; and displaying as a function of
ie the output waveform produced by the filtering device.
 this way, a synthetic seismogram is produced that can
 correlated with a field seismogram obtained adjacent
: borehole.

In some cases, like that of FIG. 8, the log signal is gen-
ited by scanning successive parts of a phonographically
iroducible well log which are short compared to the
minant wavelength of the seismic wave pulse to pro-
ce an electrical signal that varies in a similar way, and
: resultant electrical signal is then transmitted through
 electrical filter. In other cases, like those of FIGS. 19
i 22, the log signal is generated by scanning successive
rts of a well log which are of a length comparable to the
igth of the seismic wave pulse, and the filtering is ac-
nplished by reproducing simultaneously scanned small
:ments of the record in different proportions. In either
:nt, for best results the log of the formation character-
c has a high definition compared with reflection seis-
igrams that are recorded in the area of the borehole.
 other words, the characteristic itself, whether it be in-
val velocity, density, resistivity, or the like, is measured
:r short depth intervals compared with the dominant
velength of the seismic wave pulse.

In effect, the synthetic seismogram trace is a measure
 the "overlapping" of the frequency spectrum of the
n strip graph and the frequency response of the seismic
se network. In practice, the earth acts like a low-pass
:r, and hence the small instantaneous variations en-
intered in the film strip graph are of little consequence
:e they produce spectral-frequency components which,
general, lie outside of the frequency response band of
 seismic pulse network. Moreover, the seismometers
ployed to detect the seismic waves attenuate the very
' frequencies. For these reasons, the field seismogram
:sesses a band-like spectrum in which both low and
h frequencies are absent. The effects of the earth and
 seismometer are simulated in the synthesis process by
ilarly filtering the well log to attenuate both low and
h frequencies.

Jenerally speaking, the formation characteristics which
 measured to produce logs employed in making syn-
tic seismograms are the characteristics which are uni-
m in small homogeneous sections of the formations.
h characteristics include, for example, interval velocity,
isity, and resistivity. However, it will be understood
t the gradient of such a characteristic is itself a char-
:ristic which may be employed in producing a syn-
tic seismogram. Thus, a log may be prepared in
ich is plotted the derivative of such a characteristic with
)ect to depth or with respect to seismic wave travel-
e. One such example specifically employed above in
ducing synthetic seismograms is ln' Z. Also, as indi-
:d, it is not necessary to employ synthetic seismic wave
;es having the same shape as the field seismic wave
;e characteristic of reflection surveys in the area under
estigation. However, best results are usually obtained
employing synthetic pulses having about the same shape
:he field pulses or at least synthetic pulses which have
:w lobes having a period corresponding to that of a field seismic wave pulse. However, even though many
other formation characteristics may be employed, and
even though pulses having wave shapes somewhat differ-
ent from field seismic wave pulses characteristic of the
area may be employed, nevertheless best results are ob-
tained by employing high-definition well logs and by em-
ploying seismic wave pulses which are very similar in
shape to the field seismic wave pulses occurring in the
area under investigation and responsible for the produc-
tion of reflections recorded in field seismograms in that
area.

Reference to FIG. 6 illustrates the fact that the loga-
rithmic function approximates the true reflection coeffi-
cient over a rather wide range, but that it departs markedly
from the true value for large values of the coefficient.
Other functional relationships could be readily selected
which could even more accurately approximate the
straight dotted line of FIG. 6 over a wide range of values
of reflection coefficients. Moreover, it will be recognized
that the logarithmic approximation is merely one non-
linear functional operation which produces desirable re-
sults. There are, in effect, many others which under suit-
able circumstances could produce even more accurate ap-
proximations to the reflection coefficient.

In fact, it would appear that nearly any fractional
power function of acoustic impedance, such as the square
root for example, would have sufficient similarity to the
logarithmic function to substantially represent the re-
flection coefficient for the purposes of the present inven-
tion.

It will also be understood that the logarithmic strip
graph employed in the embodiment described herein-
above, although convenient in form, may be replaced by
one exhibiting the actual reflection coefficient plotted
versus the total seismic wave travel-time. In other words,
the exact value of the reflection coefficient may be de-
termined for any one time by means of Equation 1 where
the values of the acoustic impedance on opposite sides of
reflecting interfaces are determined from the appropriate
point on the interval-velocity log. In this way, a film
strip graph may be formed whose changes are propor-
tional to the actual reflection coefficient values, and it
may then be employed in apparatus of the type illus-
trated herein to produce a synthetic seismogram.

It is thus seen that although only a few specific embodi-
ments and applications of the invention have been de-
scribed herein, the principles underlying the invention
may be embodied in many other forms and may be ap-
plied in many other ways than those specifically described
and illustrated. It is therefore to be understood that the
invention encompasses not only the specific embodiments
thereof described herein, but also other embodiments
within the scope of the appended claims.

The invention claimed is:

1. In a seismogram synthesizer:
   cross-correlation means having an input and an output,
      said cross-correlation means having such a character-
      istic that a variable input signal applied at a point
      in said input generates at said output a composite
      signal which is the cross-correlation function of a
      seismic wave pulse and a function of said input sig-
      nal,
   means for creating an input signal which varies with
      time as a function of a characteristic of a well log
      and for applying said input signal to the input of
      said cross-correlation means to produce a synthetic
      seismogram signal at said output,
   and means for displaying said synthetic seismogram
      signal.

2. A seismogram synthesizer comprising:
   means for obtaining well log data for making a record
      thereof,
   a well log transducer having an input and an output,
      said transducer including a scanning device at its in-
      put, means for moving a record of a well log relative to said scanning device whereby an electrical synthetic seismogram signal is generated in the output of said transducer, said transducer comprising a filter having a plurality of elements so related that the characteristics of said transducer are so related to the speed of movement of said well log relative to said scanning device and the spectrum of a seismic wave pulse characteristic of waves generated at the surface of the earth and reflected thereto from strata in the neighborhood of a well with respect to which such well log data are obtained that a composite electrical signal is produced at said output that varies as a running cross-correlation function of said pulse and successive overlapping section of said well log, and means for displaying said synthetic seismogram signal.

3. A seismogram synthesizer comprising:

means for obtaining well log data for making a record thereof, a record transducer including a scanning device at its input, means for moving a well log relative to said scanning device whereby said well log generates an electrical signal in the output of said transducer, said transducer including a pulse generating means which responds to a sudden change in said log to produce at its output an electrical pulse that resembles a seismic wave pulse, and means for displaying said electrical signal.

4. In geophysical prospecting, the method which comprises the steps of logging a well by measuring a physical characteristic of formations that intersect said well at different depths thereof, said characteristic of earth formations being measured as a function of depth over depth intervals that are small compared with the dominant wavelength of a seismic wave pulse occurring in the area of said formations, preparing a record in which a characteristic of said record varies along a record axis as a function of the measurements of said formation characteristic, scanning said record along said axis, and during the scanning process attenuating low-frequency components and high-frequency components of said record lying outside of a predetermined frequency band compared with components within said band by emphasizing components having wavelengths in a selected band that includes said dominant wavelength, thereby producing a synthetic seismogram signal representing a succession of waves reflected from such formations.

5. In geophysical prospecting, the method which comprises the steps of:

preparing a well log of a physical characteristic of earth formations as a function of depth over depth intervals that are small compared with the dominant wavelength of a seismic wave pulse occurring in the area of said formations, preparing a record of said well log in which a characteristic of said record varies along a record axis as a function of said formation characteristic, translating said record into another record by scanning said record along said axis, and during the translating process attenuating low-frequency components and high-frequency components of said log lying outside of a predetermined frequency band compared with components within said band by emphasizing components having wavelengths in a selected band that includes said dominant wavelength, thereby producing a synthetic seismogram representing a succession of waves reflected from such formations.

6. In geophysical prospecting, the method which comprises the steps of:

measuring a characteristic of earth formations as a function of depth over intervals that are small compared with the dominant wavelength of a seismic wave pulse in the area of said formations, utilizing the measurements of said characteristic to prepare a log in which a log characteristic varies along the length of the record as a function of the way said formation characteristic varies with depth, translating said log into another record by scanning said log along said axis at such a rate that the log characteristics are scanned in the same sequence as the respective formations occur below the surface of the earth, and during the translating process attenuating low-frequency components and high-frequency components of said log lying outside of a predetermined frequency band compared with components within said band by emphasizing components having wavelengths in a selected band that includes said dominant wavelength, thereby producing a synthetic seismogram representing a succession of waves reflected from such formations.

7. In geophysical prospecting, the method which comprises the steps of:

measuring a characteristic of earth formations as a function of depth, generating component seismic wave pulse signals that have amplitudes that vary as a function of the measurements and that succeed each other in time in the same order as the formations succeed each other in depth, forming a synthetic seismogram signal representing waves reflected successively from said formations by combining said seismic wave pulse signals in accordance with the order of the formations corresponding to the respective seismic wave pulse signals.

8. In geophysical prospecting, the method which comprises the steps of:

preparing a phonographically reproducible log of a characteristic of earth formations intersected by a well borehole, electromechanically translating said well log into a synthetic seismogram representing a succession of waves reflected from such formations, altering said well log at a point thereof at which the characteristic of a selected formation is indicated, and electromechanically translating said altered well log into a second synthetic seismogram representing a succession of waves reflected from such formations.

9. In geophysical prospecting, the method which comprises the steps of:

preparing a phonographically reproducible log of a characteristic of earth formations intersected by a well borehole, electromechanically translating said well log into a synthetic seismogram representing a succession of waves reflected from such formations, altering the length of said well log at a point thereof at which the characteristic of a formation at a selected depth is indicated, and electromechanically translating said altered well log into a second synthetic seismogram representing a succession of waves reflected from such formations but with an altered depth relationship.

10. In geophysical prospecting, the method which comprises the steps of:

preparing a phonographically reproducible well log of a characteristic of earth formations intersected by a well borehole, electromechanically translating said well log into a first synthetic seismogram representing a succession of waves reflected from such formations, altering the value of a characteristic represented on said well log at a point thereof at which the characteristic of a selected formation is indicated, and electromechanically translating said altered well log into a second synthetic seismogram representing a succession of waves reflected from such formations but with the value of the characteristic of said selected formation altered.

11. In geophysical prospecting, the method which comprises the steps of:

recording a series of field seismograms at various locations throughout an area undergoing investigation, noting the travel-time in the various field seismograms at which a change occurs in a reflected wave from one location to another, preparing a phonographically reproducible log of a characteristic of earth formations intersected by a well borehole in said area, determining the point on said well log that corresponds with the travel-time at which said reflected wave occurs on said particular field seismogram, altering said well log at said point, electromechanically translating said altered well log into a synthetic seismogram representing a succession of waves reflected from said formations but with an alteration therein, and correlating said synthetic seismogram with a field seismogram recorded at a location remote from said well borehole.

12. In geophysical prospecting, the method which comprises the steps of:

recording a series of field seismograms at various locations throughout an area undergoing investigation including one location adjacent a well borehole and at least one location remote from said well borehole, noting the travel-time in the various field seismograms at which a change occurs in a reflected wave from one location to another, phonographically reproducible preparing a log of a characteristic of earth formations intersected by said well borehole, electromechanically translating said well log into a synthetic seismogram representing a succession of waves reflected from said formations, correlating said synthetic seismogram with the particular field seismogram recorded at the location of the well borehole, determining the point on said well log that corresponds with the travel-time at which said reflected wave occurs on said particular field seismogram, altering said well log at said point, electromechanically translating said altered well log into a second synthetic seismogram representing a succession of waves reflected from such formations but with an alteration in the formation corresponding to said point, and correlating said latter synthetic seismogram with a field seismogram recorded at a location remote from the well borehole.

13. In geophysical prospecting, a method which comprises the steps of:

measuring the values of a characteristic of formations in an area as a function of depth over intervals that are small compared with the dominant wavelength of a seismic wave pulse in that area, and preparing from said measurements a phonographically reproducible log of the logarithm of said values as a function of seismic wave travel-time.

14. In geophysical prospecting, a method which comprises the steps of:

measuring the values of a characteristic of formations in an area as a function of depth over intervals that are small compared with the dominant wavelength of a seismic wave pulse in that area, preparing from said measurements a phonographically reproducible log of the logarithm of said values as a function of seismic wave travel-time, electromechanically translating said log into corresponding electrical signals by scanning said log at a constant speed, and filtering said electrical signals by emphasizing components having wavelengths in a selected band that includes said dominant wavelength, thereby producing a synthetic seismogram.

15. In geophysical prospecting, the method which comprises the steps of:

measuring the values of interval velocity of earth formations intersecting a well borehole as a function of depth in said well borehole, measuring the values of a characteristic of successive earth formations that varies with the density of said earth formations as a function of depth in said well borehole over the same depth range, and generating by means of the two sets of measurements so obtained an electric signal which varies as a function of seismic wave travel-time in the way the logarithm of the product of the interval velocity and the density of the formations varies as a function of seismic wave travel-time along the length of the borehole.

16. In geophysical prospecting, the method which comprises the steps of:

measuring the values of a physical characteristic of earth formations arranged in sequence beneath the surface of the earth, generating a series of voltage signals in accordance with the values of such characteristic and arranged in the same sequence in time as the respective formations are arranged in depth, in said voltage-wave generating process attenuating low-frequency components and high-frequency components of said series of signals which lie outside of a predetermined frequency band compared with components of said series of signals within said band, frequencies in said predetermined frequency band corresponding to frequencies in which the energy of a seismic wave pulse reflected from such formations is concentrated, and producing a synthetic seismogram signal representing a succession of waves reflected from such formations by combining the signals so attenuated in a time relationship corresponding to the sequence of formations.

17. In geophysical prospecting, the method which comprises the steps of:

preparing a log of a physical characteristic of earth formations in an area in which the values of said characteristic are arranged on said log in an order related to the sequence of the formations in the earth, scanning said log to generate a voltage-wave which varies with the values of said characteristic as a function of time in the same order that the respective formations are arranged in depth, in said voltage-wave generating process attenuating low-frequency components and high-frequency components of the log which lie outside of a predetermined frequency band compared with components of the log within said series of signals within said band, frequencies in said predetermined frequency band corresponding to frequencies in which the energy of a seismic wave pulse reflected from such formations is concentrated, and producing a synthetic seismograph signal representing a succession of wave reflected from such formations by combining the signals so attenuated in a time relationship corresponding to the sequence of formations.

18. In geophysical prospecting, the method which comprises the steps of:

preparing a log of a characteristic of earth formations in an area as a function of seismic wave travel-time, logarithmically scanning said log to generate a voltage-wave which varies as a function of wave travel-time in the same way that the logarithm of the values of said characteristic vary as a function of seismic wave travel-time, and in said voltage-wave generating process attenuating low-frequency components and high-frequency components of the log which lie outside of a predetermined frequency band compared with components of the log within said band thereby producing a synthetic seismogram signal representing a succession of waves reflected from such formations.

19. Improved well logging apparatus comprising:
a recording element,
a mechanism for driving a recording medium lengthwise past said recording element,
means for measuring the value of a characteristic of earth formations as a function of depth,
means controlled by said measuring means to actuate said recording element to produce on said record indications of values of said formation characteristic,
and means operating said mechanism during the recording of the values of said characteristic of successive formations for displacing the recording medium by an amount proportional to the seismic wave travel-time to the formation whose characteristic is being recorded, whereby a log is produced in which said formation characteristic is represented as a function of wave travel-time along the length of the record.

20. Improved well logging apparatus comprising:
a recording element,
a mechanism for driving a recording medium lengthwise past said recording element,
means including a detector movable along the length of a borehole for measuring the value of a characteristic of earth formations as a function of depth,
means controlled by said measuring means to actuate said recording element to produce on said record an indication of values of said formation characteristic,
and means for driving said mechanism during the recording of the values of said characteristic of successive formations at a rate which is inversely proportional to the interval velocity of the formation whose characteristic is being recorded at the time, whereby a log is produced in which said formation characteristic is represented as a function of wave travel-time along the length of the record.

21. Improved well logging apparatus comprising:
a recording element,
a mechanism for driving a recording medium lengthwise past said recording element,
a first detecting unit for detecting a characteristic of an adjacent earth formation other than interval velocity,
a second detecting unit for detecting interval velocity of an adjacent earth formation,
means for moving said two detector units together along the length of a borehole,
means controlled by said first detecting unit for actuating said recording element to produce on said record indications of the values of said formation characteristic,
and means controlled by said second detecting unit for driving said mechanism during the recording of the value of said characteristic of formations at successive depths at a rate that is inversely proportional to the interval velocities of the formations at the respective depths, whereby a log is produced in which said formation characteristic is represented as a function of wave travel-time along the length of the record.

22. Improved well logging apparatus comprising:
a recording element,
a mechanism for driving a recording medium lengthwise past said recording element,
an interval-velocity detecting unit,
means for moving said detecting unit along the length of a borehole,
means controlled by said detecting unit for actuating said recording element to produce on said recording medium indications of the value of the interval velocity of the formation opposite which said detecting unit is located at the time, and
means controlled by said detecting unit for driving said mechanism during the recording of the value of said interval velocity at successive depths in the borehole at a rate that is inversely proportional to the interval velocities of the formations at the respective depths, whereby a log is produced in which interval velocity is represented as a function of wave travel-time along the length of the recording medium.

23. In a seismogram synthesizer:
cross-correlation means having an input and an output, said cross-correlation means having such a characteristic that a variable input signal applied to said input generates at said output a composite signal which is the cross-correlation function of a seismic wave pulse and a function of said input signal,
means for recording a well log in which a characteristic of successive formations in a well is plotted as a function of the relative positions of the formations along the length of the well,
means controlled by said well log for creating a signal which varies with time as a function of said characteristic,
means for applying said signal to the input of said cross-correlation means to produce a synthetic seismogram signal at said output, and
means for displaying said synthetic seismogram signal.

24. In geophysical prospecting, the method which comprises the steps of:
measuring the values of the interval velocity of earth formations intersecting a well borehole as a function of depth in said well borehole,
measuring the values of a characteristic of successive earth formations that varies with the density of said earth formations as a function of depth in said well borehole over the same depth range,
generating by means of the two sets of measurements so obtained an electric signal which varies as a function of seismic wave travel time in the way the logarithm of the product of the interval velocity and the density of the formations varies as a function of seismic wave travel time along the length of the borehole, and
recording said electric signal as a variable characteristic along the length of a recording medium.

References Cited by the Examiner
UNITED STATES PATENTS

| | | | |
|---|---|---|---|
| 2,543,532 | 2/1951 | Neufeld | 340—18 X |
| 2,604,955 | 7/1952 | Hawkins | 181—.5 |
| 2,713,147 | 7/1955 | Stripling | 181—.5 |
| 2,779,428 | 1/1957 | Silverman | 181—.5 |

BENJAMIN A. BORCHELT, *Primary Examiner.*

SAMUEL FEINBERG, CHESTER L. JUSTUS,
*Examiners.*